(12) United States Patent
Pulikkaseril et al.

(10) Patent No.: US 12,730,197 B2
(45) Date of Patent: Sep. 8, 2026

(54) ADAPTIVE SPATIAL ESTIMATION SYSTEM

(71) Applicant: BARAJA PTY LTD, New South Wales (AU)

(72) Inventors: Cibby Pulikkaseril, New South Wales (AU); Anton Lohr, New South Wales (AU); Stanley Lam, New South Wales (AU)

(73) Assignee: Baraja Pty Ltd, New South Wales (AU)

( * ) Notice: Subject to any disclaimer, the term of this patent is extended or adjusted under 35 U.S.C. 154(b) by 1007 days.

(21) Appl. No.: 17/789,271

(22) PCT Filed: Dec. 24, 2020

(86) PCT No.: PCT/AU2020/051438
§ 371 (c)(1),
(2) Date: Jun. 27, 2022

(87) PCT Pub. No.: WO2021/138709
PCT Pub. Date: Jul. 15, 2021

(65) Prior Publication Data

US 2023/0341526 A1 Oct. 26, 2023

(30) Foreign Application Priority Data

Jan. 7, 2020 (AU) ................................ 2020900029

(51) Int. Cl.
*G01S 7/48* (2006.01)
*G01S 7/481* (2006.01)
*G01S 7/484* (2006.01)
*G01S 17/89* (2020.01)

(52) U.S. Cl.
CPC ............ *G01S 7/484* (2013.01); *G01S 7/4817* (2013.01); *G01S 17/89* (2013.01)

(58) Field of Classification Search
USPC .......................................................... 356/4.01
See application file for complete search history.

(56) References Cited

U.S. PATENT DOCUMENTS 9,383,753 B1 7/2016 Templeton et al.
9,983,590 B2 * 5/2018 Templeton ........... G05D 1/0231
10,324,187 B2 * 6/2019 Smits ...................... G01S 17/48
10,698,112 B2 * 6/2020 Embry .................... G01S 17/89
(Continued)

FOREIGN PATENT DOCUMENTS

WO WO-2017184336 A2 * 10/2017 ........... G01S 17/931

OTHER PUBLICATIONS

International Search Report in PCT International Application No. PCT/AU2020/051438, mailed Mar. 10, 2021.
(Continued)

*Primary Examiner* — James R Hulka
(74) *Attorney, Agent, or Firm* — Cognition IP, P.C.; Edward Steakley

(57) ABSTRACT

Methods and apparatus for directing light into an environment are described, for example methods and apparatus for use in a light detection and ranging system that scans light across an environment for spatial estimation. The method and system involves scanning at one angular resolution and temporal resolution in a first scan and scanning at a different angular resolution and temporal resolution (one or both) in a second scan.

18 Claims, 27 Drawing Sheets

(56) References Cited

U.S. PATENT DOCUMENTS

| | | | | |
|---|---|---|---|---|
| 11,644,669 | B2 * | 5/2023 | Yeoh | G02B 27/0172 345/8 |
| 2016/0274589 | A1 | 9/2016 | Templeton et al. | |
| 2016/0306044 | A1 | 10/2016 | Smits et al. | |
| 2018/0275410 | A1 | 9/2018 | Yeoh et al. | |
| 2018/0284234 | A1 | 10/2018 | Curatu | |
| 2018/0364334 | A1 * | 12/2018 | Xiang | G01S 17/42 |
| 2019/0219701 | A1 | 7/2019 | Embry et al. | |
| 2020/0081101 | A1 * | 3/2020 | Donovan | G01S 17/06 |
| 2022/0187471 | A1 * | 6/2022 | Eshel | G01S 7/4814 |

OTHER PUBLICATIONS

Indu Vijayan, “New Performance Metrics for Lidar” Autonomous Vehicle Engineering, May 2019, pp. 21-23.

Extended European Search Report received in European application No. 20912953.5 mailed Jan. 5, 2024.

* cited by examiner

*Figure 18*

Vertical axis
(i.e. the first
dimension)

Horizontal axis
(i.e. the second dimension)

ADAPTIVE SPATIAL ESTIMATION SYSTEM

CROSS-REFERENCE TO RELATED APPLICATIONS

The present application is a 35 U.S.C. § 371 national stage application of PCT International Application No. PCT/AU2020/051438, filed on Dec. 24, 2020, which claims priority from Australian patent application number 2020900029, filed 7 Jan. 2019, which are hereby incorporated by reference in their entirety.

The present application relates to international patent application PCT/AU2016/050899 (published as WO 2017/054036 A1), PCT/AU2017/051395 (published as WO 2018/107237 A1), international patent application PCT/AU2018/050901 (published as WO 2019/036766 A1) and international patent application PCT/AU2019/050437 (published as WO 2019/241825 A1) and the entire content of each of these applications is incorporated into this disclosure by reference.

FIELD OF THE DISCLOSURE

The present disclosure generally relates to a system and method for directing an optical beam. More particularly, the present disclosure relates to a system and method for directing an optical beam in two dimensions. Particular embodiments relate to directing light into an environment having a depth dimension over two dimensions, for example for spatial estimation.

BACKGROUND OF THE DISCLOSURE

Optical beam direction has several uses, including but not limited to LiDAR (light detection and ranging) applications, in which light is sent into an environment for spatial estimation purposes. In three-dimensional mapping, one of the dimensions relates to the range of a point from the origin of the optical beam, whereas the other two dimensions relate to the two dimensional space (e.g. in Cartesian (x, y) or polar (theta, phi) coordinates) the optical beam is steered across. The range of the point in the environment represents a primary variable of the environment for measurement. The other two dimensions extend across a field of view of the three-dimensional mapping system.

LiDAR systems scan one or more optical beams across an environment. Two significant performance variables of LiDAR systems include the frame rate or time it takes to complete a scan (temporal resolution) of a field of view and the resolution or number of pixels across or within the field of view (point density). The point density across or within the field of view is also referred to as the angular resolution. The frame rate and the angular resolution have and are inter-related by one or more limiting factors. One limiting factor is the time it takes for an optical amplifier to recover between optical pulses for a given output power (which affects range). Another limiting factor is the required field of view. The limitations result in a trade-off between angular resolution and temporal resolution. “Scanning” herein generally refers to adjustment in optical beam direction, and unless the context requires otherwise a “scan” herein refers to a full or partial iteration of scanning. These terms do not necessarily require any continuity in optical emission during the adjustment or iteration. Further, these terms do not necessarily require any constant optical characteristics, such as optical energy and wavelength, during the adjustment or iteration.

SUMMARY OF THE DISCLOSURE

The disclosure relates to methods and apparatus for directing light into an environment, for example in a light detection and ranging system that scans light across an environment for spatial estimation. The method and system involves scanning at one angular resolution and temporal resolution in a first scan and scanning at a different angular resolution and temporal resolution (one or both) in a second scan.

In an aspect of the present disclosure there is provided a method of optical beam direction, the method including providing, in a light detection and ranging system, to a beam director configured to direct the optical beam based on wavelength:

- one or more first optical beams comprising a first set of wavelengths that the beam director directs in a first set of directions; and subsequently
- one or more second optical beams comprising a second set of wavelengths different to the first set of wavelengths that the beam director directs in a second set of directions, different to the first set of directions.

In another aspect of the present disclosure there is provided a method of optical beam direction, the method including providing, in a light detection and ranging system, to a beam director configured to direct the optical beam based on wavelength:

- one or more first optical beams comprising a first set of N wavelengths that the beam director directs in a first set of directions; and subsequently
- one or more second optical beams comprising a second set of M wavelengths that the beam director directs in a second set of directions, wherein N is different to M.

In another aspect of the present disclosure there is provided a method of optical beam direction in a light detection and ranging system operable over a field of view, the method including:

- providing, to a beam director configured to direct light based on wavelength one or more first light beams to effect within the field of view a first angular resolution and first temporal resolution by the light detection and ranging system;
- receiving light returned from an environment and analysing, by the light detection and ranging system, the received light;
- selecting, based on the analysis of the received light one or more second light beams to effect within the field of view a second angular resolution and second temporal resolution and providing the selected one or more second light beams to the beam director;
- wherein over at least a portion of the field of view at least one of:
  - the second angular resolution differs from the first angular resolution; and
  - the second temporal resolution differs from the first angular resolution.

In another aspect of the present disclosure there is provided a method of optical beam direction in a light detection and ranging system operable over a field of view, the method including:

- by a wavelength controlled light source, providing to a beam director configured to direct light into an environment based on wavelength one or more first light beams to effect, by the light detection and ranging system, a first angular resolution and a first temporal resolution within the field of view;

receiving light returned from an environment and generating, by the light detection and ranging system, at least one signal indicative of a characteristic of the environment;

receiving a selection of a scan profile associated with one or more second light beams to effect a second angular resolution and second temporal resolution within the field of view and providing the selected one or more second light beams to the beam director;

wherein the selection is based on the at least one signal and wherein over at least a portion of the field of view at least one of:

the second angular resolution differs from the first angular resolution; and the second temporal resolution differs from the first angular resolution.

In another aspect of the present disclosure, there is provided a method of optical beam direction in a light detection and ranging system operable over a field of view, the method including:

providing to a beam director one or more first light beams to effect, by the light detection and ranging system, a first angular resolution and a first temporal resolution within the field of view;

receiving light returned from an environment and generating, by the light detection and ranging system, at least one signal indicative of a characteristic of the environment;

receiving a selection of a scan profile associated with one or more second light beams to effect a second angular resolution and second temporal resolution within the field of view and providing the selected one or more second light beams to the beam director;

wherein the selection is based on the at least one signal and wherein over at least a portion of the field of view the second angular resolution differs from the first angular resolution and wherein the one or more second light beams effect the second angular resolution within a first portion of the field of view and also effect a third angular resolution within a second portion of the field of view different to the first portion, wherein the third angular resolution is different to the second angular resolution.

In another aspect of the present disclosure, there is provided a method of optical beam direction in a light detection and ranging system operable over a field of view, the method including:

by a wavelength controlled light source, providing to a beam director configured to direct light into an environment based on wavelength one or more first light beams to effect, by the light detection and ranging system, a first angular resolution and a first temporal resolution within the field of view;

receiving light returned from an environment and generating, by the light detection and ranging system, at least one signal indicative of a characteristic of the environment;

receiving a selection of a scan profile associated with one or more second light beams to effect a second angular resolution and second temporal resolution within the field of view and providing the selected one or more second light beams to the beam director;

wherein the selection is based on the at least one signal and wherein over at least a portion of the field of view the second angular resolution differs from the first angular resolution and wherein the one or more second light beams effect the second angular resolution within a first portion of the field of view and also effect a third angular resolution within a second portion of the field of view different to the first portion, wherein the third angular resolution is different to the second angular resolution.

In another aspect of the present disclosure, there is provided a method of optical beam direction in a light detection and ranging system, the method including:

in a first set of one or more scan iterations, direct the light across a first field view at a first angular resolution profile across a first dimension of the field of view; and in a second set of one or more scan iterations, direct the light across the first field of view at a second angular resolution profile across the first dimension, the second angular resolution profile different to the first angular resolution profile;

wherein the frame rate or temporal resolution of the first set of one or more scan iterations is the same as the frame rate or temporal resolution of the second set of one or more scan iterations.

The field of view may comprise a second dimension orthogonal to the first dimension and the method may include either maintaining or changing the angular resolution profile across the second dimension for the first set of one or more scan iterations and the second set of one or more scan iterations. The angular resolution may be substantially uniform along the second dimension or may include an area of compressed angular resolution.

In another aspect of the present disclosure, there is provided a method of optical beam direction in a light detection and ranging system, the method including:

in a first set of one or more scan iterations, direct the light within a first field view at a first angular resolution profile across a first dimension of the field of view; and in a second set of one or more scan iterations, direct the light within the first field of view at a second angular resolution profile across the first dimension, the second angular resolution profile different to the first angular resolution profile;

wherein the first resolution profile has a substantially uniform angular resolution across the first dimension and the second resolution profile does not have a uniform angular resolution across the first dimension.

The non-uniform angular resolution may include a compressed region along the first dimension within the field of view. The compressed region may correspond to a determined foveation area within the field of view. At least one of the first set and second set of scan iterations may extend across the entire first field of view. The frame rate or temporal resolution may be the same for the first set and second set of scan iterations.

In some embodiments of any of the aspects above, a static set of scan profiles is provided and a selection from the available scan profiles is made to effect the described change in angular and/or temporal resolution. The static set of scan profiles may be the only profiles used for spatial estimation or additional dynamically formed scan profiles may be used in addition to the static set, based on the estimated environment as detected by the spatial estimation system.

In further aspects of the present disclosure there is provided apparatus for optical beam direction configured to implement a method described in the preceding paragraphs.

In further aspects of the present disclosure there is provided non-transient computer storage including instructions to cause a processing unit of a spatial estimation system to perform a method described in the preceding paragraphs.

Still further aspects of the present disclosure and further embodiments of the aspects described in the preceding paragraphs will become apparent from the following description, given by way of example and with reference to the accompanying drawings.

BRIEF DESCRIPTION OF THE DRAWINGS

FIG. 18 illustrates other scan profiles that may be included in a predetermined set.

DETAILED DESCRIPTION OF EMBODIMENTS

Figure 1:
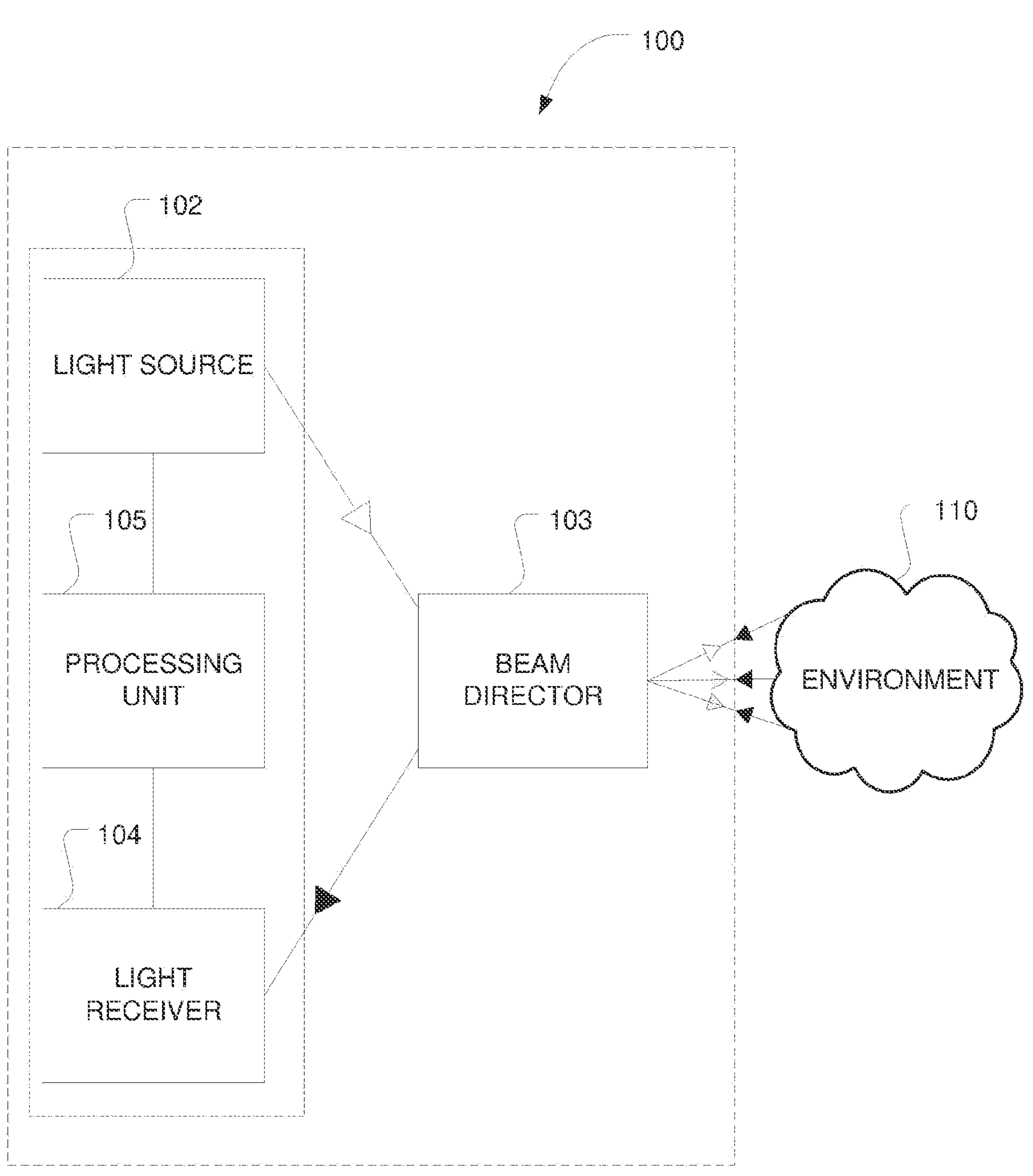
FIG. 1 illustrates a module for spatially profiling an environment.

Within a LiDAR system, one or both of the angular resolution and the temporal resolution can be affected by changing/adjusting the field of view. For example, in some embodiments of a LiDAR system one scan may be completed across a field of view for the system ("first field of view") and a subsequent scan may be completed across a smaller field of view ("second field of view"). The second field of view is a part of the first field of view. In other embodiments, the second field of view is larger than the first field of view. The first and the second fields of view may overlap. In any of these embodiments, the LiDAR system may, in a further subsequent scan, be configured to return to scanning across the first field of view.

Additionally or instead (e.g. when the first and second fields of view are the same size), one or both of the angular resolution within a portion of the field of view and the temporal resolution can be affected by changing the point density. In wavelength-steerable LiDAR systems, such as those described in the applicant's international patent application no. PCT/AU2016/050899 (published as WO 2017/054036 A1), the point density can be changed by changing the number of optical pulses or other optical ranging signals per scan and/or by configuring the wavelength channel of the optical pulses or other optical ranging signals so that more (or less) pulses or ranging signals are within a first set of one or more wavelength ranges and less (or more) pulses or ranging signals are within a second set of one or more wavelength ranges; the wavelength range(s) in the second set being different to the wavelength range(s) in the first set.

In LiDAR systems with one or more mechanical steering components, the field of view and/or point density can be changed by changing the number of optical pulses or other optical ranging signals per scan and/or by adjusting the steering rate of one or more of the mechanical steering components. For instance, if the mechanical steering component rotates in order to direct light in different directions, a change in the rotation rate can effect a corresponding change in the temporal resolution and may also effect a corresponding change in the angular resolution. In LiDAR systems with one or more mechanical steering components and which is configured for wavelength-based steering, either or both the mechanical components and components affecting the wavelength-based steering may be controlled. Examples of a LiDAR system with both wavelength and mechanical based steering are described in the applicant's international patent application nos. PCT/AU2017/051395 (published as WO 2018/107237 A1) and PCT/AU2019/050437 (published as WO 2019/241825 A1).

For example, in some embodiments of a LiDAR system one scan may be completed with a first point density at a first frame rate and a subsequent scan may be completed at a second point density at a second frame rate. The second point density may be lower than the first point density and the second frame rate may be higher than the first frame rate (enabled at least in part by the lower point density). A further subsequent scan may be completed at the first point density and first frame rate.

In another example, in some embodiments of a LiDAR system one scan may be completed with one point density distribution, for example a substantially uniform point density across the field of view, and then complete a subsequent scan with another point density distribution, for example a non-uniform point density distribution across the same or different field of view, for example with a relatively increased point density within one or more sub-regions of the field of view, optionally with a reduced point density outside of the sub-region(s). The LiDAR system may, in a further subsequent scan, return to scanning using the original (uniform) point density distribution.

In a further example, both the total number of points within a frame and the distribution of the points within the field of view may be adapted so as to differ between scans.

Some embodiments combine two or more of the above examples.

Embodiments of the present disclosure recognise that LiDAR systems with particular characteristics can be paired with control systems for adjusting the field of view, for example as described above, to provide for effective control over temporal and/or angular resolution. This control may provide a more effective LiDAR system at least in certain applications. For example, in applications where LiDAR systems are used for autonomous vehicles with an ability to increase temporal resolution in relation to detected fast moving objects (relative to the LiDAR system) and/or an ability to increase angular resolution in relation to detected relatively distant objects may allow for improved performance.

The advantages of adjusting the field of view may be further improved for some applications or situations if the location and/or size and/or shape of the second field of view can also be adapted. For example, if a fast moving and/or distant object is detected, an ability of the system to foveate on that object (e.g., by using increased point density within a region at the object relative to a region not at the object) may be advantageous. Foveation in the context of a LiDAR system refers to the ability to be controlled to exhibit differential temporal resolution and/or to exhibit differential angular resolution in different regions of the field of view. Similar advantages may be achieved if the location and/or size and/or shape of the sub-regions in which point density varies can also be adapted.

The present disclosure relates to embodiments of a LiDAR system including a beam director that directs an optical beam into the environment within a field of view based at least in part on wavelength of the optical beam. For example, in the aforementioned three-dimensional mapping, scanning across at least one of the two dimensions in two dimensional space (e.g. in Cartesian (x, y) or polar (theta, phi) coordinates). The scanning across the at least one dimension may be linear or non-linear.

In some embodiments the optical component(s) of the beam director that effect scanning across a dimension do not include mechanically moving parts to effect control over the field of view from the first field of view to the second field of view. Further, in some embodiments the optical components of the bean director that effect foveation in addition to the transition from the first field of view to the second field of view also do not include mechanically moving parts. For example, the relevant optical components do not include scanning mirrors to effect the required control over the beam direction.

In some embodiments the optical components of the beam director that effect scanning across a dimension include one or more dispersive elements. The one or more dispersive elements may consist of or include one or a combination of two or more gratings, prisms, grisms and arrayed waveguide gratings. The dispersive elements may be non-moving or at least non-moving to effect scanning across the one or more dimensions for field of view control and/or foveation. An example LiDAR system with optical beam direction using dispersive elements is described in the applicant's international patent application no. PCT/AU2016/050899 (published as WO 2017/054036 A1).

Described herein are embodiments of an optical system (in particular a spatial profiling arrangement) for directing an optical beam based at least in part on wavelength(s) of the light within the optical beam, in which the improvement or control over angular and/or temporal resolution may be effected. The improvement or control over angular and/or temporal resolution may be applied to other optical systems (including other spatial profiling arrangements) for directing an optical beam based on the wavelength channel of the optical beam.

The described embodiments are capable of steering light based on one or more selected wavelength channels. While the following description refers to selecting a single wavelength channel (e.g. by tuning a wavelength-tunable laser), a person skilled in the art would appreciate that the description is also applicable, with minor modifications (e.g. optically coupling together two or more wavelength-tunable lasers), to select two or more wavelength channels.

The described embodiments can be used as or for a beam director, for example, in a spatial profiling arrangement for estimating the spatial profile (e.g. the z-axis or depth) of an environment. Other example applications for beam direction include spectrometry, optical line-of-sight communications (for example as described in the applicant's international patent application PCT/AU2018/050901, published as WO 2019/036766 A1), 2D scanning on manufacturing lines, projectors, 2D printers, adaptive illumination and so on. While the following description focusses on spatial profile estimation, a person skilled in the relevant art would appreciate that the description is, with minor modification, also applicable to the other beam direction applications.

FIG. 1 illustrates an example of a spatial profiling arrangement 100. The arrangement 100 includes a light source 102, a beam director 103, a light receiver 104 and a processing unit 105. In the arrangement of FIG. 1, outgoing light from the light source 102 is directed by the beam director 103 in a direction in two dimensions into an environment 110 having a spatial profile. If the outgoing light hits an object or a reflecting surface, at least part of the outgoing light may be reflected (represented in solid arrows), e.g. scattered, by the object or reflecting surface back to the beam director 103 and received at the light receiver 104. The processing unit 105 is operatively coupled to the light source 102 for controlling its operations. The processing unit 105 is also operatively coupled to the light receiver 104 for determining the distance to the reflecting surface, by determining the round-trip distance travelled by the reflected light.

Processing unit 105 includes at least one processing device. The processing unit 105 may be a single computer processing device (e.g. a central processing unit, graphics processing unit, a programmed firmware chip, an application specific integrated circuit or other computational device), or may include a plurality of computer processing devices of the same and/or different type. In some instances all processing will be performed by a processing unit 105 with physical components local to other components of the spatial profiling arrangement 100, however in other instances processing may also be performed at least in part by remote processing devices accessible and useable (either in a shared or dedicated manner) by the spatial profiling arrangement 100. At least some forms of these processing devices will have one or more associated machine readable storage (memory) devices which store instructions and/or data for controlling operation of that processing device and in turn the processing unit 105 and spatial profiling arrangement 100. Communication between a processing device and a memory device may be through a communication bus.

The processing unit 105 also includes one or more interfaces (not shown), via which the processing unit interfaces with various devices (e.g. the light source 102 and light receiver 104) and/or networks. Generally speaking, other devices may be integral with the processing unit 105, or may be separate. Where a device is separate, the connection may be via wired or wireless hardware and communication protocols, and may be a direct or an indirect (e.g. networked) connection.

The light source 102, the beam director 103, the light receiver 104 may be optically coupled to one another via free-space optics and/or optical waveguides such as optical fibres or optical circuits in the form of 2D or 3D waveguides. Outgoing light from the light source 102 is provided to the beam director 103 for directing into the environment. Beam expansion optics may be provided between the light source 102 and the beam director 103 (or may be a part of either). Any reflected light collected by the beam director 103 may be directed to the light receiver 104. In one example, light from the light source 102 is also provided to the light receiver 104 for optical processing purposes via a direct light path (not shown) from the light source 102 to the light receiver 104. For example, the light from the light source 102 may first enter a sampler (e.g. a 90/10 fibre-optic coupler), where a majority portion (e.g. 90%) of the light is provided to the beam director 103 and the remaining sample portion (e.g. 10%) of the light is provided to the light receiver 104 via the direct path. In another example, the light from the light source 102 may first enter an input port of an optical switch and exit from one of two output ports, where one output port directs the light to the beam director 103 and the other output port re-directs the light to the light receiver 104 at a time determined by the processing unit 105. Techniques for determining the spatial profile of an environment are described in the incorporated international application no. PCT/AU2016/050899 (WO 2017/054036 A1).

Figure 2A:
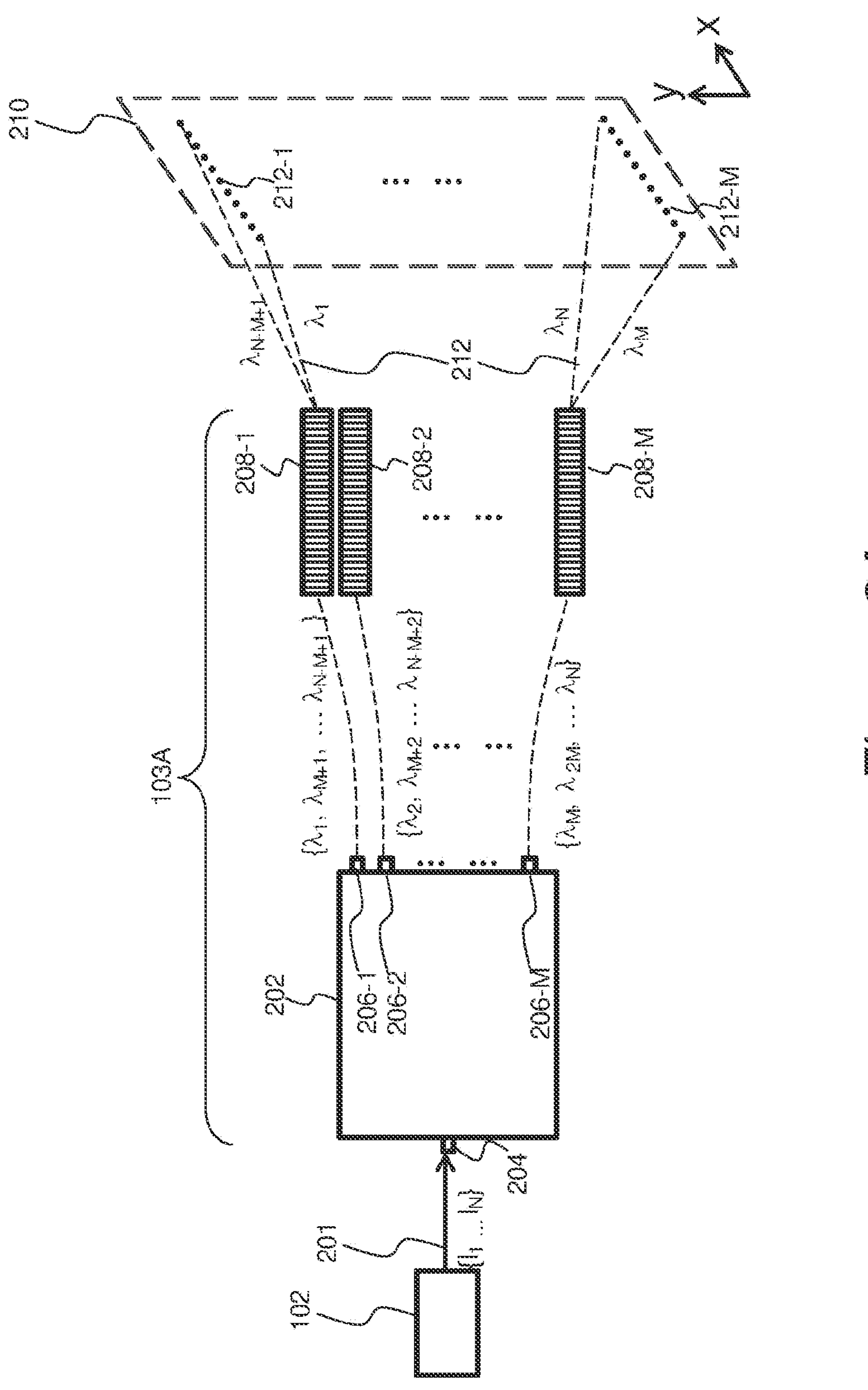
FIGS. 2A and 2B illustrate schematically a first embodiment of an optical beam director.

FIG. 2A illustrates an embodiment 103A of the beam director 103 of FIG. 1. The light 201 from the light source 102 includes a selected one of N wavelength channels grouped into M groups of non-neighbouring wavelength channels. The light source 102 may be a wavelength-tunable laser, allowing selection of the desired wavelength channel via an electronic control signal. Each group of non-neighbouring wavelength channels include non-consecutive wavelength channels. The M groups of non-neighbouring wavelength channels may be interleaved wavelength channels. In one example, where the N wavelength channels are designated by their centre wavelengths $\lambda_1, \lambda_2, \ldots \lambda_N$, the M groups of interleaved wavelength channels are $\{\lambda_1, \lambda_{M+1}, \ldots \lambda_{N-M+1}\}$, $\{\lambda_2, \lambda_{M+2} \ldots \lambda_{N-M+2}\}$, . . . and $\{\lambda_M, \lambda_{2M}, \ldots \lambda_N\}$. That is, in this example, each group includes evenly spaced wavelengths channel (in this case, every M wavelength channels), and all M groups have the same spacing. In another example, the non-neighbouring wavelength channels may be non-interleaved wavelength channels, but still spread almost from $\lambda_1$ to $\lambda_N$ (e.g. $\{\lambda_1, \ldots \lambda_N\}$, $\{\lambda_2, \ldots \lambda_{N-2}\}$, . . . and $\{\lambda_M, \lambda_{N-M}\}$). In either example, each group of interleaved wavelength channels spreads almost from $\lambda_1$ to $\lambda_N$, the tunable range of the light source 102.

The exemplified beam director 103A includes a wavelength router 202 (e.g. an optical interleaver) for routing light 201 of a group of non-neighbouring wavelength channels from a first port 204 to one of second ports 206-1, 206-2 . . . 206-M (collectively 206). The routing is based on the selected wavelength channel. For example, in an interleaving arrangement, the beam exemplified director 103A is configured to route the first M consecutive wavelength channels to the respective M second ports. That is, $\lambda_1$ is routed to port 206-1, $\lambda_2$ is routed to port 206-2, . . . and $\lambda_M$ is routed to port 206-M. Further, the beam director 103A is configured to route the second M consecutive wavelength channels to the respective M second ports. That is, $\lambda_{M+1}$ is routed to port 206-1, $\lambda_{M+2}$ is routed to port 206-2, . . . and $\lambda_{2M}$ is routed to port 206-M. The exemplified beam director 103A is configured for similar routing for the rest of the wavelength channels. That is, in the interleaving arrangement, each subsequent lot of M consecutive wavelength channels are routed to respective M second ports. In effect, each second port is associated with a respective one of the groups of non-neighbouring wavelength channels $\lambda_{kM+n}$, where k∈0 to N−1, and n represents a designated second port. For example, the exemplified beam director 103A is configured to route the light 201 at any of the wavelength channels $\lambda_{kM+1}$ to the port 206-1, wavelength channels $\lambda_{kM+2}$ to port 206-2 . . . and wavelength channels $\lambda_{(k+1)M}$ to port 206-M.

The second ports 206 are arranged to direct the routed light across a wavelength dimension. This wavelength dimension may be, related to, or otherwise associated with the first dimension (e.g. along the y-axis of FIG. 2A or the vertical direction). In FIG. 2A, the association arises from the arrangement of physical separation of the second ports 206 to allow independent direction of the outgoing light along the y-axis. The beam director 103A further includes an array of dispersive elements 208-1, 208-2 . . . 208-M (collectively 208) arranged to each receive the routed light from the respective one of the second ports 206. The dispersive elements 208 is optically coupled (e.g. via one or more of waveguide-coupling, fibre-coupling and free-space-coupling mechanisms (including collimating elements)) to the second ports 206 to receive the routed light. The optical coupling is represented as dashed lines in FIG. 2. Each of the array of dispersive elements 208 is configured to further direct the received light across the second dimension (e.g. along the x-axis of FIG. 2A or the horizontal direction). In one example, one or more of the array 208 of dispersive elements each include a free-space diffractive coupler. Alternatively or additionally, the one or more of the array 208 of dispersive elements include a diffraction grating, a prism and a grism. Still alternatively or additionally, the dispersive elements 208 may each be a single element or multiple elements, with the dispersive elements 208 each being waveguide-coupled to the output ports 206 in a waveguide (M waveguides in total), and with the M waveguides all propagating through the same optical component. The beam director 103A may include one or more collimating elements to collimate the outgoing light 212 (represented in dashed lines in FIG. 2A) from the dispersive elements 208.

Figure 2B:
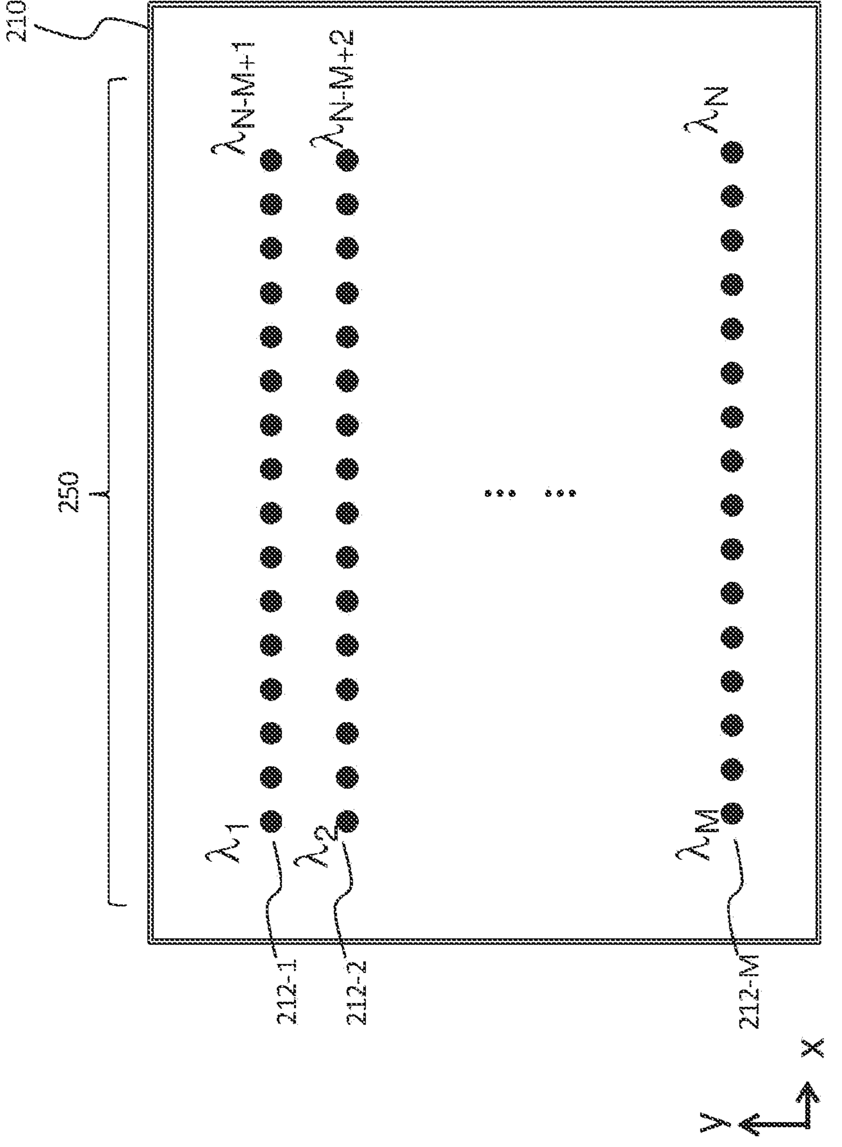

For illustrative purposes, a screen 210 which is not part of the described system 103A is depicted in FIGS. 2A and 2B to depict the spatial distribution of the outgoing optical beam 212 when the selected wavelength is swept between $\lambda_1$ and $\lambda_N$. FIG. 2B illustrates schematically an illustrative image 250 of a screen 210 located at the output of the system 103A to intercept the outgoing light. Each dot in FIG. 2B represents a selected one of the wavelength channels $\lambda_1, \lambda_2, \ldots \lambda_N$. Note that each dot in practice appears independently based on the selected wavelength channel(s), but for illustration purposes all dots are depicted in FIG. 2B simultaneously as if they could be captured at the same time. The illustrative image 250 indicates M groups (212-1, 212-2 . . . 212-M) of light output. The number of dots per group is merely illustrative and does not represent the actual number. The M groups of light output correspond to the respective M dispersive elements 208-1, 208-2 . . . 208-M. These groups are distributed over the first dimension (e.g. y-axis), with each extending across the second dimension (e.g. x-axis) substantially perpendicular to the first dimension. The first dimension may not necessarily exactly coincide with the wavelength dimension (i.e. the dimension in which the light is directed to by the wavelength router 202), and the second dimension may not necessarily exactly coincide with dimension orthogonal to the wavelength dimension.

In a non-limiting example for illustrative purposes, the light source 102 may include a telecommunications-grade laser. A telecommunications-grade laser may have a wavelength-tunable range of 100 nm, such as from approximately 1527 nm to approximately 1567 nm (or about 5000 GHz at 1550 nm), tunable in steps of 0.0004 nm to 0.008 nm (or steps of about 50 MHz to 1 GHz at 1550 nm). For example, if the light source 102 is wavelength-tunable over 40 nm, there is a total of about 5000 steps (i.e. N=5000).

The wavelength router 202 is an optical interleaver including eight (i.e. M=8) second ports, with each port associated with 625 interleaved wavelengths channels (e.g. $\lambda_1, \lambda_9, \lambda_{17} \ldots \lambda_{4993}$ being routed to one second port, $\lambda_2, \lambda_{10}, \lambda_{18} \ldots \lambda_{4994}$ being routed to another second port, and so on with $\lambda_8, \lambda_{16}, \lambda_{24} \ldots \lambda_{5000}$ being routed to the last second port). Due to the grouping of non-neighbouring wavelength channels into respective second ports, such as in groups of interleaved wavelength channels, each second port is configured to receive and direct light spanning almost the entire tunable range of the light source 120 (e.g. with $\lambda_1$ to $\lambda_{4993}$ spanning about 40 nm−(8×0.008 nm)=39.936 nm). In comparison, where neighbouring channels are otherwise grouped (e.g. $\lambda_1$ to $\lambda_{625}$ to the first second port, etc.), each group span only a fraction (e.g. one-eighth) of the entire tunable range of the light source 120 (e.g. with $\lambda_1$ to $\lambda_{625}$ spanning about 40 nm/8=5.0 nm). Accordingly, not only does the grouping of the non-neighbouring wavelength channels into respective second ports facilitate beam direction across the first dimension, the grouped wavelength channels being non-neighbouring also allows for a greater spread of the range of wavelength channels and hence, for a given dispersion of the dispersive elements 208, an increase of beam divergence across the second dimension.

Figure 3A:
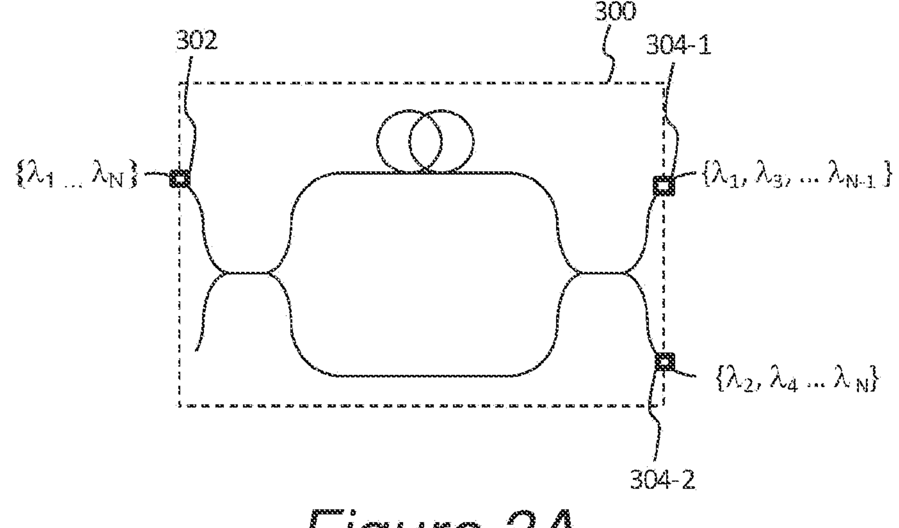
FIGS. 3A and 3B illustrate different arrangements of an optical interleaver.

In one arrangement, the optical interleaver 202 may include one or more Mach-Zehnder interferometers (MZIs). FIG. 3A illustrates an example of a MZI 300 in a 1-by-2 optical interleaver. The MZI 300 may be waveguide-based or fibre-based. The MZI 300 includes an input port 302 and two output ports 304-1 and 304-2 (collectively 304). The MZI includes a fixed path difference between the two arms of the interferometer such that light entering the input port 302 appears at one of the output ports 304 based on the wavelength channels. In one example, the input port 302 is configured to receive light of a wavelength channel $\{\lambda_1, \lambda_2, \ldots \lambda_N\}$ and route the light to the output port 304-1, if the received wavelength channel is one of $\{\lambda_1, \lambda_3, \ldots \lambda_{N-1}\}$, or to the output port 304-2, if the received wavelength channel is one of $\{\lambda_2, \lambda_4, \ldots \lambda_N\}$. Using parameters in the numerical example above, the 1-by-2 optical interleaver may be implemented by configuring the MZI 300 to have a free spectral range (FSR) of 0.008 nm (or about 1 GHz at 1550 nm).

Figure 3B:
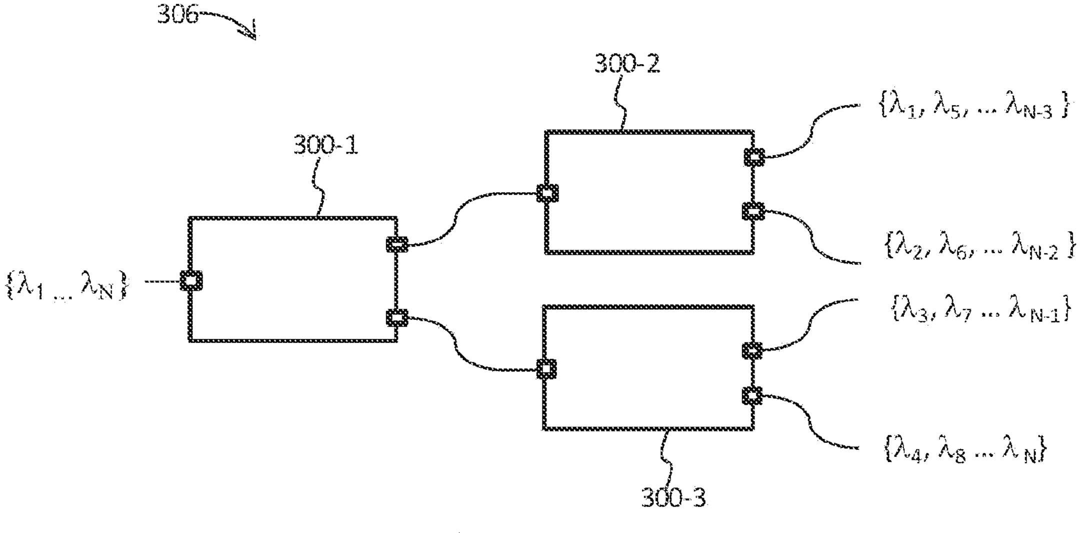

FIG. 3B illustrates a cascaded MZI 306 in a 1×4 optical interleaver. The cascaded MZI 306 includes three constituent MZIs 300-1, 300-2 and 300-3 each as illustrated in FIG. 3A. The two output ports of a preceding MZI 300-1 are optically coupled to the respective input ports of two succeeding MZIs 300-2 and 300-3. Each of the succeeding MZIs 300-2 and 300-3 include two output ports. The cascaded MZI 306 therefore includes a total of four output ports. Each constituent MZI in the cascaded MZI 306 has a respective path difference in their two interferometric arms to facilitate routing of wavelength channels in an interleaving manner. For example, the cascaded MZI 306 is configured to receive light of a wavelength channel $\{\lambda_1, \lambda_2, \ldots \lambda_N\}$ and route the light to output port number k (where $k \in \{1, 2, 3, 4\}$) if the received wavelength channel is one of $\{\lambda_k, \lambda_{k+4}, \ldots \lambda_{N-4+k}\}$. A skilled person would appreciate that a 1-by-M optical interleaver may be implemented using cascading Q constituent MZIs where M=Q+1 is the number of output ports, each associated with a group of interleaved wavelength channels. An output port number k (where $k \in \{1, 2, \ldots M\}$) receives routed light if the received wavelength channel is one of $\{\lambda_k, \lambda_{k+M}, \lambda_{N-M+k}\}$.

A skilled person would also appreciate that, in practice, cross-talk exists due to light being routed to an unintended port. That is, in practice, an output port number k may receive a small amount of routed light even if the received wavelength channel is not one of $\{\lambda_k, \lambda_{k+M}, \ldots \lambda_{N-m+k}\}$. In one example, a level of cross-talk is about −30 dB or lower.

Figure 4:
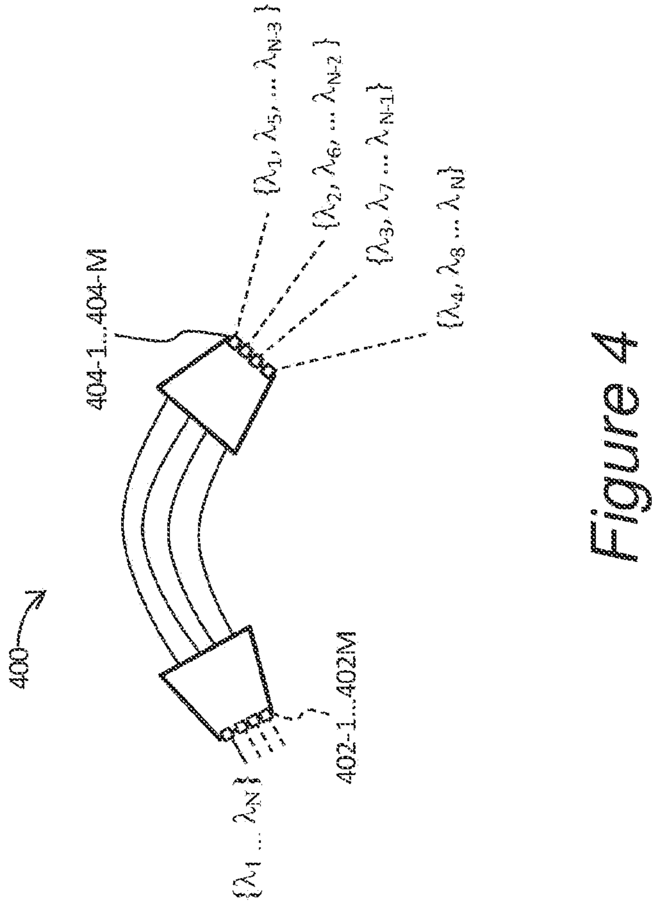
FIG. 4 illustrates an example of an arrayed waveguide grating.

In another arrangement, the optical interleaver 202 may include one or more arrayed waveguide gratings (AWGs). In one example, the one or more AWGs include at least one cyclic AWG (sometimes known as colourless AWG). FIG. 4 illustrates an example of a M-by-M cyclic AWG 400. The cyclic AWG 400 may be waveguide-based or fibre-based. The cyclic AWG 400 includes multiple input ports 402-1 . . . 402-M and multiple output ports 404-1 . . . 404-M. For example, the cyclic AWG 400 is configured to receive light of a wavelength channel $\{\lambda_1, \lambda_2, \ldots \lambda_N\}$ at any of its input ports 402, and route the light to output port 404 number k if the received wavelength channel is one of $\{\lambda_k, \lambda_{k+M}, \ldots \lambda_{N-M+k}\}$. Cyclic AWGs typically has a smaller FSR, compared to that of non-cyclic AWGs, such that there is expected to be more routed wavelength channels per output port.

In yet another arrangement, the optical interleaver 202 may include one or more echelle demultiplexers.

In yet another arrangement, the optical interleaver 202 may include any combination of one or more MZIs, one or more AWGs, such as cyclic AWGs and one or more echelle demultiplexers.

Accordingly, the optical interleaver 202 includes M second ports, corresponding to the M groups of wavelength channels, each second port carrying M/N non-neighbouring channels. In one case, one of M and N/M is at least 8, 16 or 32. This case corresponds to a beam director where light is directed across one of the first and second dimensions over at least 8, 16 or 32 pixels (e.g. generating 8, 16 or 32 dots across x or y axis in FIG. 2B). For example, in a previously described arrangement, M is 8. In another example, M is 16. In yet another example, M is 32.

Further, an optical interleaver with a smaller FSR carries more wavelength channels per second port. In one use case, the FSR is designed to be no more than 10 GHz. In another use case, the FSR is designed to be no more than 5 GHz. In yet another use case, the FSR is designed to be no more than 1 GHz. For example, in an hereinbefore described arrangement, the FSR is 1 GHz.

Figure 5:
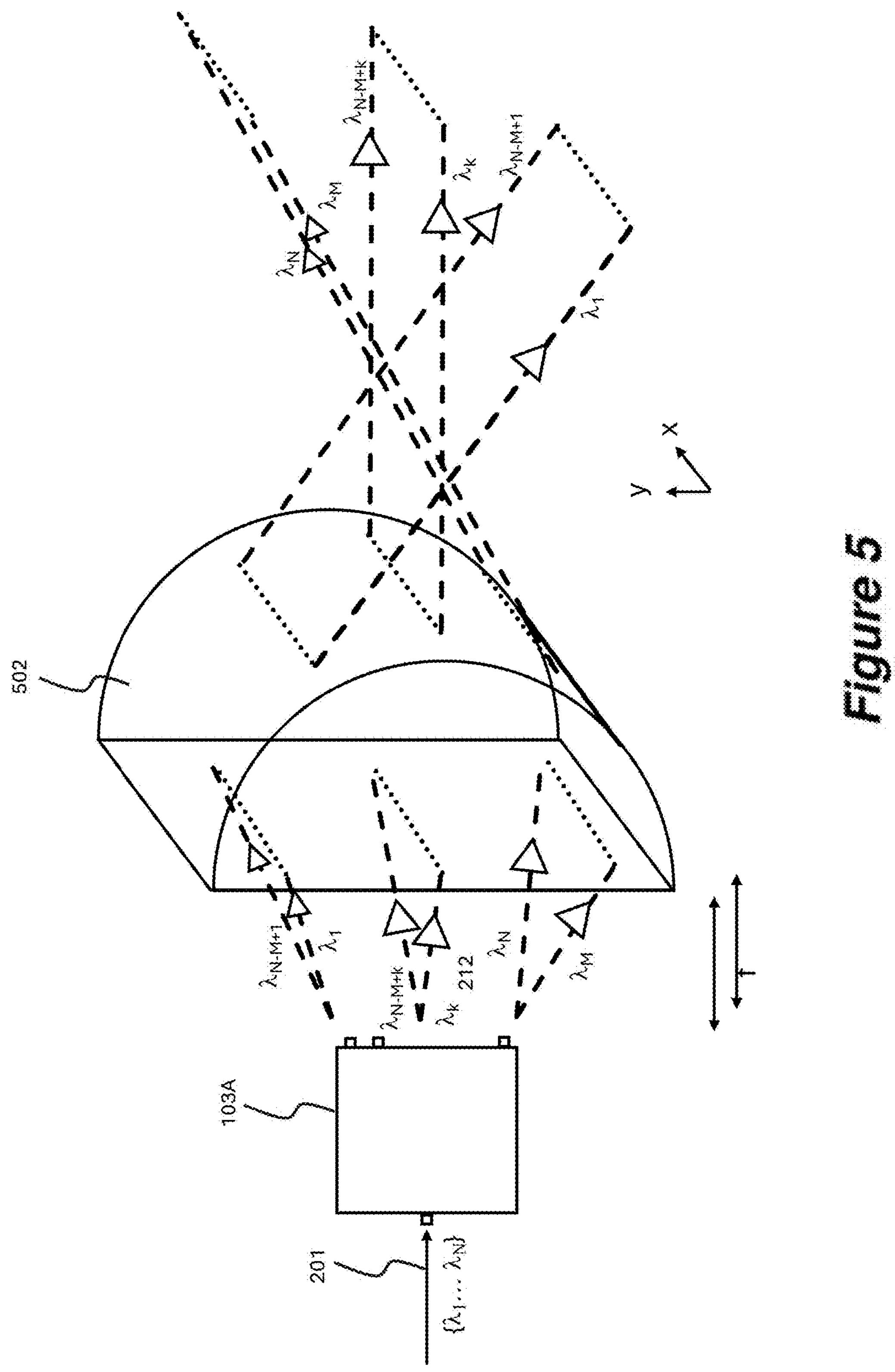
FIG. 5 illustrates the first embodiment of the beam director with a collimating element.

In one arrangement, as illustrated in FIG. 5, the beam director 103A may be optically coupled to or may further include a collimating element 502 to collimate the outgoing optical beam 212. For simplicity, only three planes of the outgoing optical beam 212 are shown. In one example, the collimating lens 502 includes a cylindrical lens. In this example, the dispersive elements 208 are located in or near the focal plane of cylindrical lens. Although not shown, if a screen is placed at the output of cylindrical lens, a distribution similar to that shown in FIG. 2B may be observed.

Figure 6:
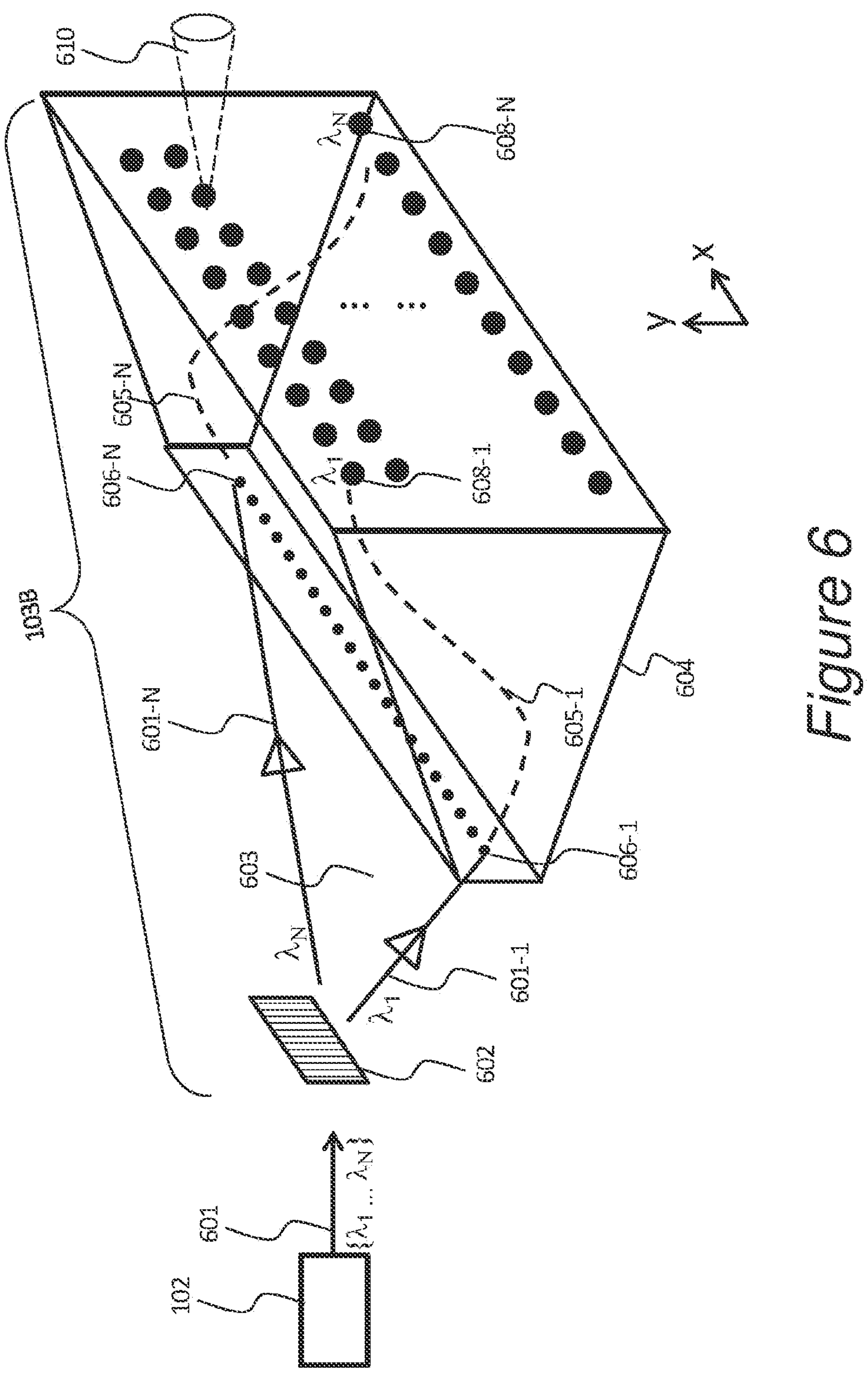
FIG. 6 illustrates schematically a second embodiment of an optical beam director.

FIG. 6 illustrates another embodiment 103B of the beam director 103 of FIG. 1. The light 601 from the light source 102 includes a selected one of N wavelength channels. The light source 102 may be a wavelength-tunable laser, allowing selection of the desired wavelength channel via an electronic control signal.

As illustrated in FIG. 6, the beam director 103B includes a dispersive element 602 arranged to direct the light over a wavelength dimension 603 (e.g. along the x-axis in FIG. 6) based on the selected one of the multiple wavelength channels $\lambda_1, \lambda_2, \ldots \lambda_N$. The beam director 103B also includes a spatial router 604 to receive the wavelength-channel-based directed light 601-1 to 601-N. The spatial router 604 includes multiple first ports (606-1 . . . 606-N, collectively 606) arranged in accordance with the wavelength dimension to receive the directed light. The spatial router 604 also includes multiple second ports (608-1 . . . 608-N, collectively 608), each associated with a respective one of the multiple first ports 606, arranged in two dimensions comprising the first dimension (e.g. along the x-axis) and the second dimensions (e.g. along the y-axis). The beam director 103B may include collimating optics (not shown), such as one or more GRIN lenses, to focus or collimate the wavelength-channel-based directed light 601-1 to 601-N into the multiple first ports. The spatial router 604 is configured for routing the directed light 601 from one of the multiple first ports 606 to the respective one of the multiple second ports 608. In one arrangement, the spatial router 604 includes a 1D-to-2D array of optical waveguides. The spatial router 604 may include optical waveguides 605-1 . . . 605-N (collectively 605 but only two are illustrated for simplicity) for optically coupling the respective pairs of first ports and second ports.

The optical waveguides 605 may be written by direct laser writing techniques in a transparent material. One such technique involves the use of femtosecond laser pulses for controllably modifying the refractive index of the transparent material via nonlinear absorption to inscribe the waveguides 605. An example of transparent material is bulk silica, which is transparent at a wide range of wavelengths including those of the light source 102 (e.g. around the 1550 nm wavelength band for a telecommunications-grade light source) and those of the direct-writing laser (e.g. around the 810 nm wavelength band for a Ti:Sapphire femtosecond laser).

The number of wavelength channels aligned with each dimension can be arbitrary, and is determined by the direct laser writing process. For example, the N wavelength channels $\lambda_1, \lambda_2, \ldots \lambda_N$ may be grouped into M groups of wavelength channels. The M groups of wavelength channels may represent M rows or M columns of second ports 608. The M groups of wavelength channels may be $\{\lambda_1, \lambda_{M+1}, \ldots \lambda_{N-M+1}\}$, $\{\lambda_2, \lambda_{M+2} \ldots \lambda_{N-M+2}\}$, . . . and $\{\lambda_M, \lambda_{2M}, \ldots \lambda_N\}$. In another example, the M groups of wavelength channels may be $\{\lambda_1, \ldots \lambda_{N/M}\}$, $\{\lambda_{N/M+1}, \ldots \lambda_{2M/N}\}$, . . . and $\{\lambda_{N-N/M}, \ldots \lambda_N\}$). Accordingly by selecting a wavelength channel (e.g. via wavelength-tuning of the light source 102), light 601 may be routed to a corresponding one of the second ports 608. The beam director 103B may include one or more collimating elements, such a lens array (not illustrated), to collimate or focus light 610 exiting the second ports 608 (if launched into the environment 110) or entering the second ports 608 (if reflected from the environment 110). The beam direction 103B may include one or more output collimating lenses in a focal plane arrangement, similar to the collimating element 502 in FIG. 5. In this arrangement, the 2D array of output ports are configured to mapped to beam direction angles in two corresponding dimensions by transform through the one or more output collimating lenses.

Figure 7:
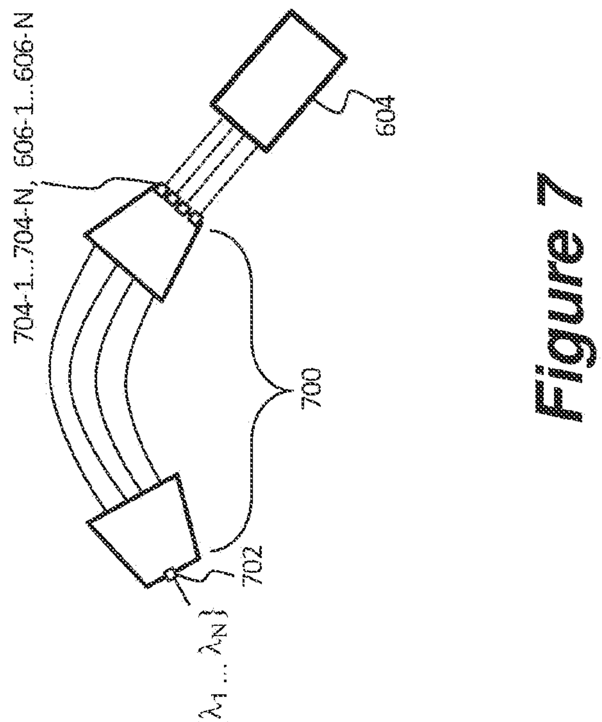
FIG. 7 illustrates an example of the second embodiment of the optical beam director.

In one arrangement, the dispersive element 602 includes any one or more of a prism, a diffraction grating and a grism. In another arrangement, as illustrated in FIG. 7, the dispersive element 602 includes an arrayed waveguide grating (AWG) 700, similar to the AWG 400 as exemplified in FIG. 4. The AWG 700 includes an input port 702 and multiple output ports 704-1 . . . 704-N. The output ports 704-1 . . . 704-N of the AWG 700 are optically coupled to the first ports 606-1 . . . 606-N, respectively, of the spatial router 604.

Figure 8A:
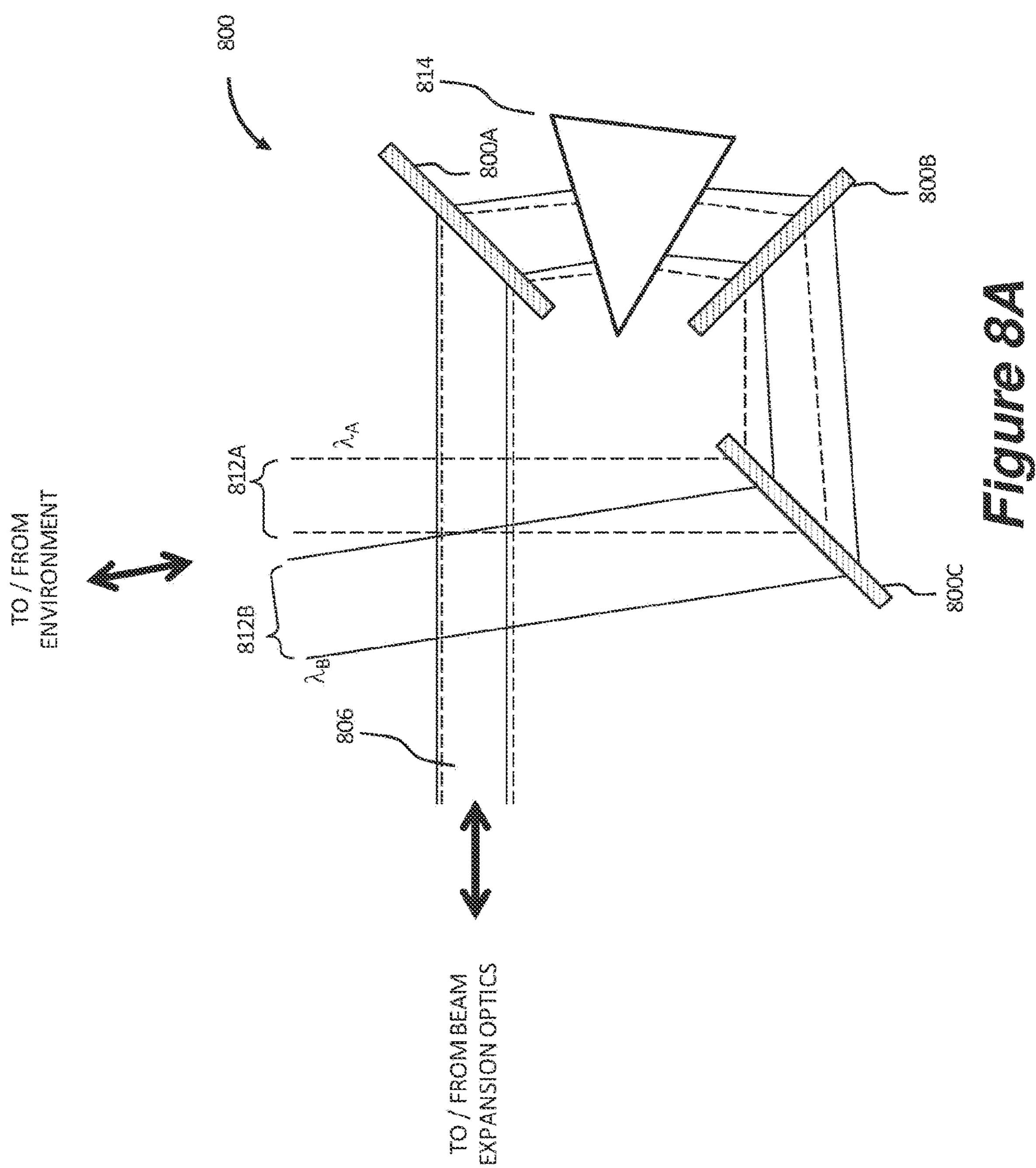
FIG. 8A-8C illustrate examples of a wavelength-steering element including multiple diffraction elements.
Figure 8B:
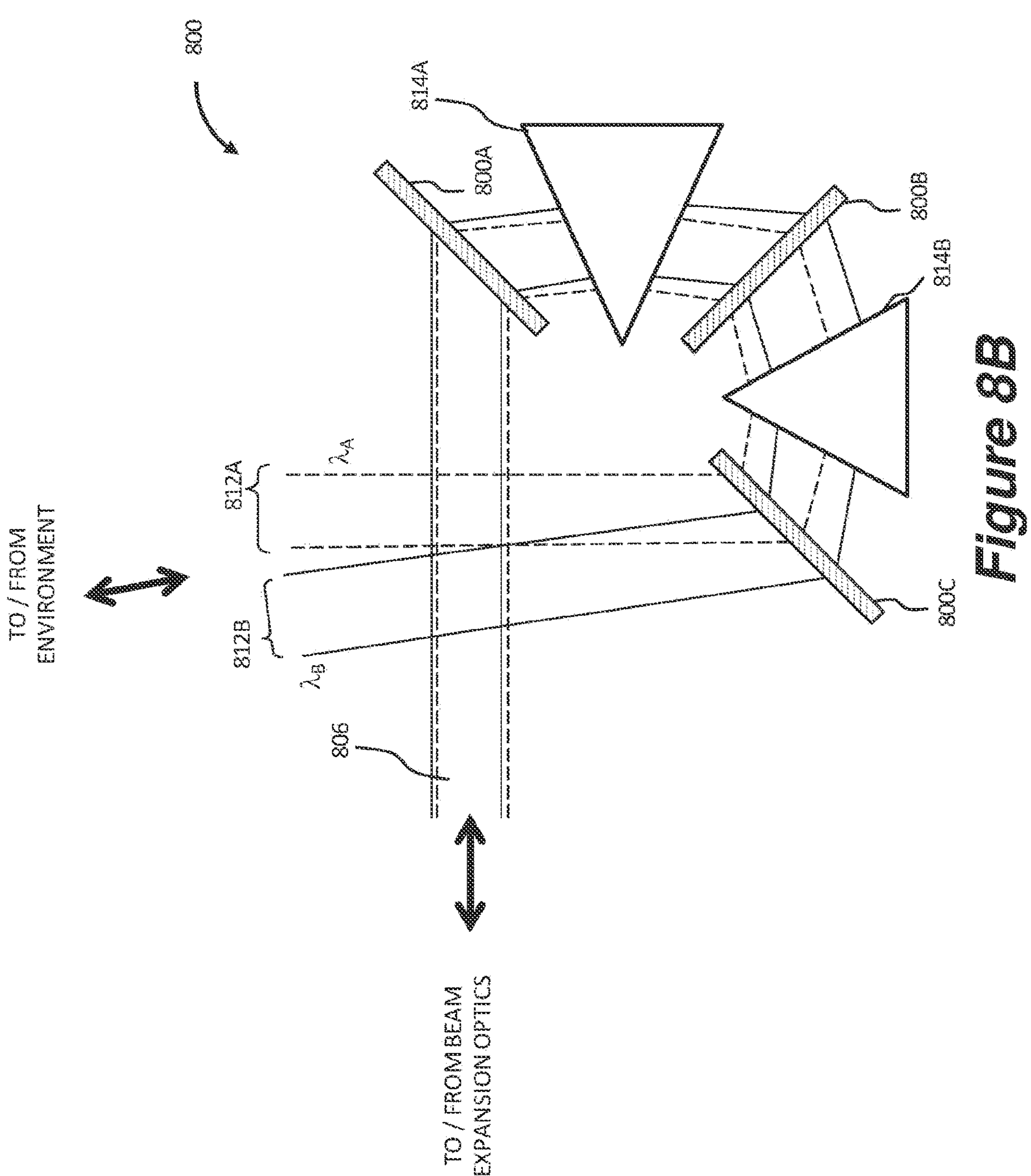
Figure 8C:
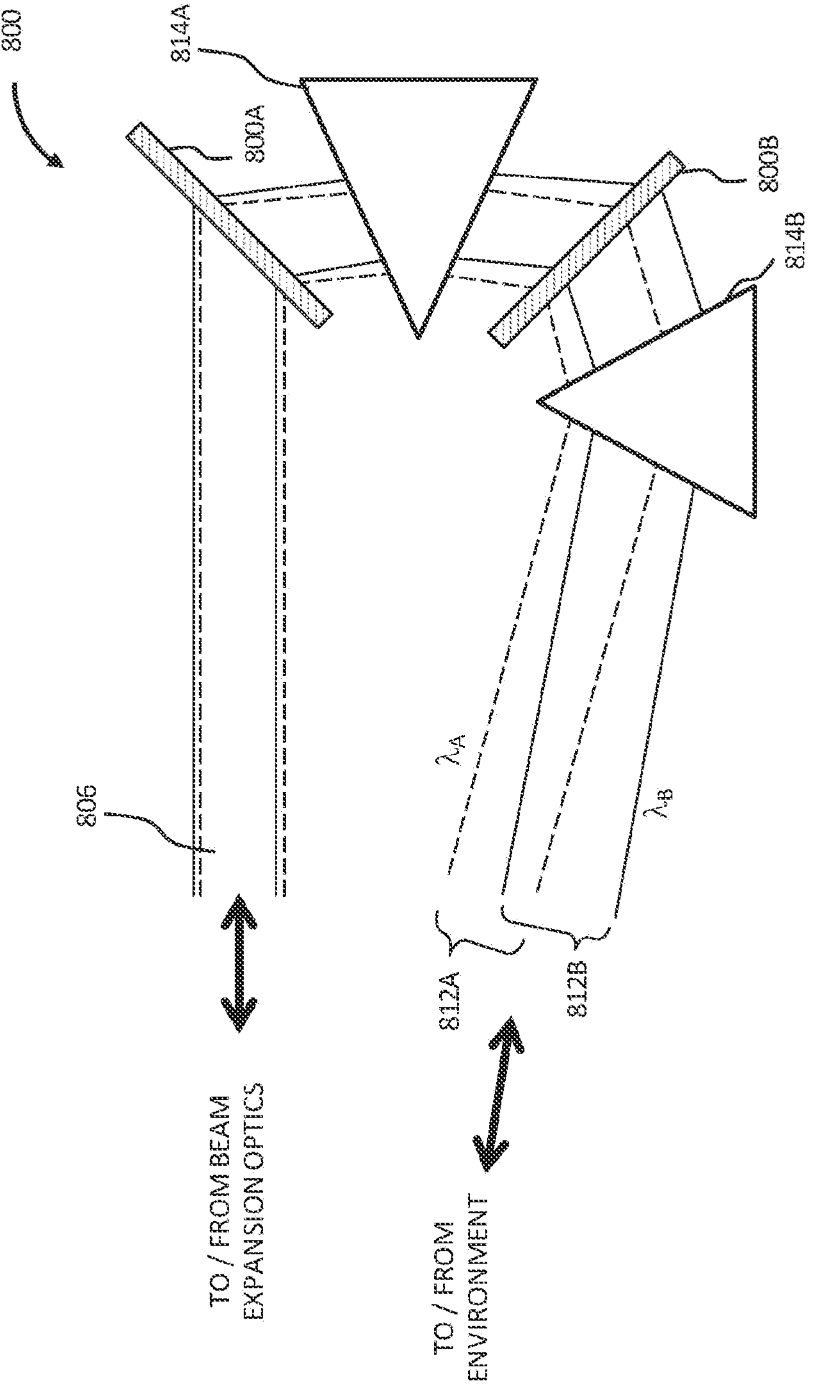

FIGS. 8A to 8C illustrate examples of a wavelength-steering element 800 including multiple diffraction elements 800A, 800B and 800C or 800A and 800B. While this example illustrates an example with two or three diffractive elements, more (e.g. four) may be used. Each additional diffractive element may provide additional diffraction, hence greater angular separation of the differently directed beams. The wavelength-steering element also includes a dispersive element 814A or more than one dispersive element 814A, 814B. In these arrangements, the one or multiple dispersive elements intersperse with the one or more multiple diffractive elements for space-saving.

The diffractive elements 800A, 800B and 800C (if present) are configured to direct the expanded beam 806 into at least a first direction 812A and a second direction 812B along a first dimension, depending on the wavelength. The first direction 812A corresponds to the outgoing light at a first selected wavelength channel $\lambda_A$. The second direction 812B corresponds to the outgoing light at a first selected wavelength channel $\lambda_B$. FIGS. 8A-8C illustrate that each diffractive element produces one diffraction order but in practice each may produce one or more additional orders. At each diffractive element, the beam is incrementally angularly dispersed. The use of multiple diffractive elements increases the angular separation compared to an arrangement with, e.g. a single diffractive element.

In the embodiments shown, the multiple diffractive elements are arranged to have their diffraction planes aligned to turn the light beam in the unidirectional beam path (e.g. clockwise as illustrated in FIG. 8A through gratings 800A, 800B and then 800C or anti-clockwise). The unidirectional beam path facilitates folding of the optical path to reduce the size of the wavelength-steering element 800 and hence the overall system footprint.

In FIGS. 8A to 8C, all diffractive elements have their diffraction axes aligned in the same direction (e.g. along the y-axis) which causes angular dispersion in a first dimension (e.g. along the x-axis). By rotating or otherwise angularly adjusting at least one of the diffractive elements (e.g. about its optic axis or z-axis) and hence rotating its diffraction axis (e.g. in the x-y plane), the optical beam may be directed over a second dimension (e.g. along the y-axis), substantially perpendicular to the first dimension (e.g. along the x-axis). The description herein refers to “rotate”, “rotation”, “rotating” or similar as including any form of angular adjustment and not necessarily elements that are, for example, constantly or continuously rotating.

Figure 9:
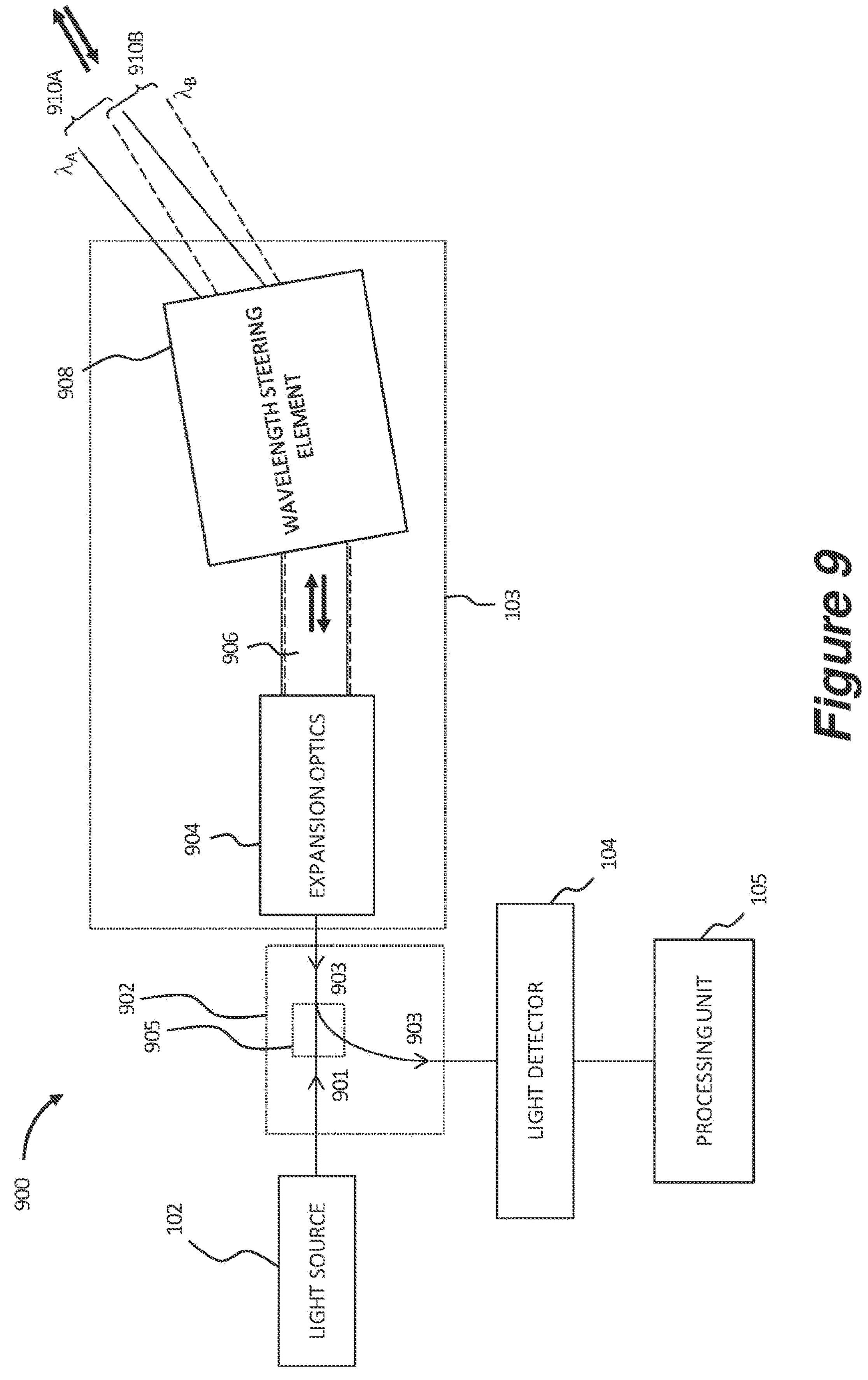
FIG. 9 illustrates another arrangement of a system to facilitate estimate of the spatial profile of an environment.

FIG. 9 illustrates an example 900 of the spatial profiling arrangement shown in FIG. 1. In this example, the system 900 includes a light transport assembly 902 configured to transport the outgoing light 901 from the light source 102 to the beam director 103 and transport the reflected light 903 from the beam director 103 to the light detector 104. The light transport assembly 902 includes optical waveguides such as optical fibres or optical circuits (e.g. photonic integrated circuits) in the form of 2D or 3D waveguides. The outgoing light from the light source 102 is provided to the beam director 103 for directing into the environment. In some embodiments, any reflected light collected by the beam director 103 may additionally be directed to the light detector 104. In one arrangement, for light mixing detection, light from the light source 102 is also provided to the light detector 104 for optical processing purposes via a direct light path (not shown) from the light source 102 to the light detector 104. For example, the light from the light source 102 may first enter a sampler (e.g. a 90/10 guided-optic coupler), where a majority portion (e.g. 90%) of the light is provided to the beam director 103 and the remaining sample portion (e.g. 10%) of the light is provided to the light detector 104 via the direct path. In another example, the light from the light source 102 may first enter an input port of an optical switch and exit from one of two output ports, where one output port directs the light to the beam director 103 and the other output port re-directs the light to the light detector 104 at a time determined by the processing unit 105.

The light transport assembly 902 includes a three-port element 905 for coupling outgoing light received from a first port to a second port and coupling received from the second port to a third port. The three-port element may include an optical circulator or a 2×2 coupler (where a fourth port is not used). In one arrangement, the light transport assembly 902 includes an outbound guided-optic route between the light source 102 and the beam director 103 for carrying the outgoing light 901 at the first and second selected wavelength channels and an inbound guided-optic route 903 between the beam director 102 and the light detector 104 for carrying the reflected light 903 at the first and second selected wavelength channels (either at the same time or at different times). The guided-optic routes may each be one of a fibre-optic route and an optical circuit route.

In one arrangement, as illustrated in FIG. 9, the beam director 103 includes beam expansion optics 904. The beam expansion optics 904 may include a pigtailed collimator 312, such as a graded-index (GRIN) lens, to provide the outgoing light 901 from a wave-guided form into free-space form and a focussing element.

It will be appreciated that within FIGS. 8A, 8B, 8C and 9, the solid lines and the dashed lines represent expanded beams in different selected wavelength channels, and are illustrated to be slightly offset for illustrative purposes. In practice they may or may not overlap substantially or entirely in space.

Control over the field of view and/or the point density can be achieved by controlling the light source 102. For example, the processing unit 105 may include a processing device that controls the one or more wavelength ranges within which pulses are generated by the light source 102.

Referring for example to the embodiments described with reference to FIGS. 2A and 2B (and optionally also FIG. 5), the field of view can be controlled by selecting the wavelength channels $\lambda_1, \lambda_2, \ldots \lambda_N$ present in a scan or sweep of the light source 102. A "full" field of view may be scanned by conducting a scan or sweep that selects each of the wavelength channels $\lambda_1, \lambda_2, \ldots \lambda_N$. A lesser field of view may be scanned by selecting one or more subsets of the wavelength channels. An example subset may for instance focus on the left side shown in FIG. 2B by including $\lambda_1$ to $\lambda_{N/2+M/2}$ or $\lambda_1$ to $\lambda_{nM}$, where n is an integer and selected to encompass the required number of columns from the left in FIG. 2B to be included in the scan. Another example subset may focus on the centre shown in FIG. 2B. Using an artificially low number of wavelength channels by way of example, in which N=20 and M=4, then a centre focussed scan may limit the wavelength channels to $\lambda_6$ to $\lambda_7$, $\lambda_{10}$ to $\lambda_{11}$ and $\lambda_{14}$ to $\lambda_{15}$.

Scanning through a lower number of wavelength channels $\lambda_X$, where X<N, allows for completion of a scan in lesser amount of time. A lesser field of view resulting from selection of a lower number of wavelength channels for the light source 102 to scan through can therefore be scanned more often within a given period of time. Scanning more often within a given period of time may be useful in certain circumstances, for example if one or more fast moving objects are detected that need to be tracked. In some embodiments, the number of wavelength channels scanned may be X, where 2X<N or 5X<N or 10X<N or 100X<N or 1000X<N or 10,000X<N.

In some embodiments the number of wavelength channels available for selection is not fixed. Within a wavelength range $\lambda_R$ encompassing and bounded by the wavelength channels $\lambda_1$ to $\lambda_N$, the light source 102 may be tunable to generate more or fewer than N wavelength channels. For example, the light source 102 may be tunable to any of 2N distinct wavelength channels within the wavelength range $\lambda_R$. Controlling the number of wavelength channels selected within a given range of wavelengths can therefore effect control over the angular resolution within a field of view corresponding to that range. For example, one scan may be completed at a first resolution using N selected channels and a subsequent scan may be completed at higher resolution using 2N selected channels (or any other number between N+1 and 2N inclusive or greater than 2N). Similarly the subsequent scan or a further subsequent scan may be at a lower resolution, if required.

In some embodiments both the selected wavelength range(s) and the number of wavelength channels selected for each wavelength range can be changed between or within scans. The number of wavelength channels selected for each wavelength range may be constant across a selected range or variable across the selected range. Similarly, where there is more than one selected wavelength range, the number of wavelength channels selected for respective wavelength ranges can be the same or different. Also where there is more than one selected wavelength range, variability in the number of wavelength channels selected for each wavelength range across the wavelength range may be different between different selected wavelength ranges.

The light source 102 may be wavelength tunable from a first set of one or more wavelength channels to a second set of one or more wavelength channels within 5 ms, such as under 500 μs, under 50 μs, under 5 μs or under 0.5 μs. The light source may be wavelength-tunable within a maximum range of 40 nm, and at a tuning speed within 8 nm/ms, such as under 80 nm/ms, under 800 nm/ms, under 8 nm/μs, or under 80 nm/μs. In some examples, the light source 102 may include a semiconductor laser whose emission wavelength is tunable based on carrier effects. It will be appreciated that scan profile may be changed quickly (e.g. for foveation purpose) with a relatively rapid wavelength-tuning characteristic of the light source 102.

In some embodiments the light source is controlled so as to control the use and distribution of a plurality point densities within the field of view. Using again the example described with reference to FIGS. 2A and 2B, increased angular resolution may be achieved for the left side by increasing the number of wavelength channels selected within a wavelength range that includes $\lambda_1$ to $\lambda_{N/2+M/2}$ to a number higher than N/2. For example, if the number of wavelength channels selected within the wavelength range $\lambda_{R1}$ is increased from N/2 (as represented by FIG. 2B) to 2N/3, then there will be increased angular resolution within the left side.

If the number of wavelength channels selected for the right side remained at N/2 there will be an increase in the total number of wavelength channels selected. This may reduce the temporal resolution of the system.

To avoid or reduce this effect on the temporal resolution, or for another reason, the number of wavelength channels selected for the right side may be reduced. For example if the number is set at N/3 the total number of selected wavelength channels will remain at N. Accordingly, in some embodiments the system has an ability to foveate on at least one region of the field of view.

Alternatively or additionally, the effect on the temporal resolution may be reduced by reducing the field of view. For example, if the scan were limited to the wavelength range $\lambda_{R1}$ then the total number of selected wavelength channels will be 2N/3. As this is less than N, the temporal resolution is increased in combination with the increase in angular resolution (at the cost of a smaller field of view). In another variation, the light source may continue to select N wavelength channels for the scan, with the remaining wavelength channels being selected outside of the wavelength range $\lambda_{R1}$, until N are selected.

The same or similar techniques as described with reference to the embodiments of FIGS. 2A and 2B can be applied to the embodiments described with reference to FIGS. 6 and 7. The spatial router of these embodiments will require a number of ports to accommodate the required operable range of angular resolutions. Similarly, the number of output ports 704-1 . . . 704-N of the AWG 600 (if used) will also need to accommodate the required operable range of angular resolutions. In effect, use of the ports is controlled by selection of the wavelength channels.

In another example, the same or similar techniques as described with reference to the embodiments of FIGS. 2A and 2B can be applied to the embodiments described with reference to FIGS. 8A to 8C. In particular, the selection of wavelength channels affects the resolution and/or distribution of points in the point cloud in the referenced first dimension (which may be called the "wavelength dimension") in the description of the embodiments of FIGS. 8A to 8C. This effect can be expanded into the second dimension by a suitable beam steering mechanism, for example rotation of a diffraction element in the wavelength steering element 800 (the second dimension may then be called the "mechanical dimension", due to physical movement effecting steering). Example spatial estimation systems with a combination of a wavelength dimension and a mechanical dimension are described in the applicant's international patent application PCT/AU2017/051395 (published as WO 2018/107237 A1).

In some embodiments with beam steering over two dimensions due to the combined operation of wavelength-based steering and mechanical steering, beam steering is quicker along the wavelength dimension (the "fast axis") than along the mechanical dimension (the "slow axis"). In these embodiments, the ability to quickly change the scan profile may be mainly realised along the fast axis. The change of the scan profile along the wavelength dimension may affect, to some degree, the scan profile along the mechanical dimension.

As previously described, embodiments of the present disclosure are configured with an ability to foveate. These embodiments may be implemented, for example, in spatial estimation systems for autonomous vehicles. In the case of the spatial profiling arrangement 100 described with reference to FIG. 1, the processing unit 105 may be controlled to dynamically select specific wavelength channels of the light source 102 to effect foveation. The foveation may be adapted to the specific environment.

In some embodiments the processing unit 105 may analyse the environment (based on the input received from the light receiver 104) and may determine a set of candidate foveation scan profiles for selection to apply to one or more subsequent scans. The selection may be made by or via a user system of the spatial profiling arrangement (e.g. an autonomous driving system). The selection may then be received by the spatial profiling arrangement and implemented in the one or more subsequent scans.

In some embodiments, the set of candidate foveation scan profiles is static and a selection from the available scan profiles is made. For example, the set of candidate foveation scan profiles may include profiles that provide for foveation at any one of M regions, which may overlap. The M regions may cover substantially the entire possible field of view of the spatial profiling arrangement.

In some embodiments there is a combination of a set of predetermined foveation scan profiles including at least two different scan profiles and an ability to determine one or more further scan profiles, different from the predetermined scan profiles based on analysis of the environment as described above. In some instances the further scan profiles are a combination of the predetermined scan profiles. For example, one scan profile may foveate on one region and another scan profile may foveate on another region and the processing unit 105 selects a profile with foveation on both regions, for instance to track two objects. In some instances the further scan profile may be formed without regard to a predetermined scan profile and instead specifically customised based on the point cloud(s) from previous scan(s).

Figure 10:
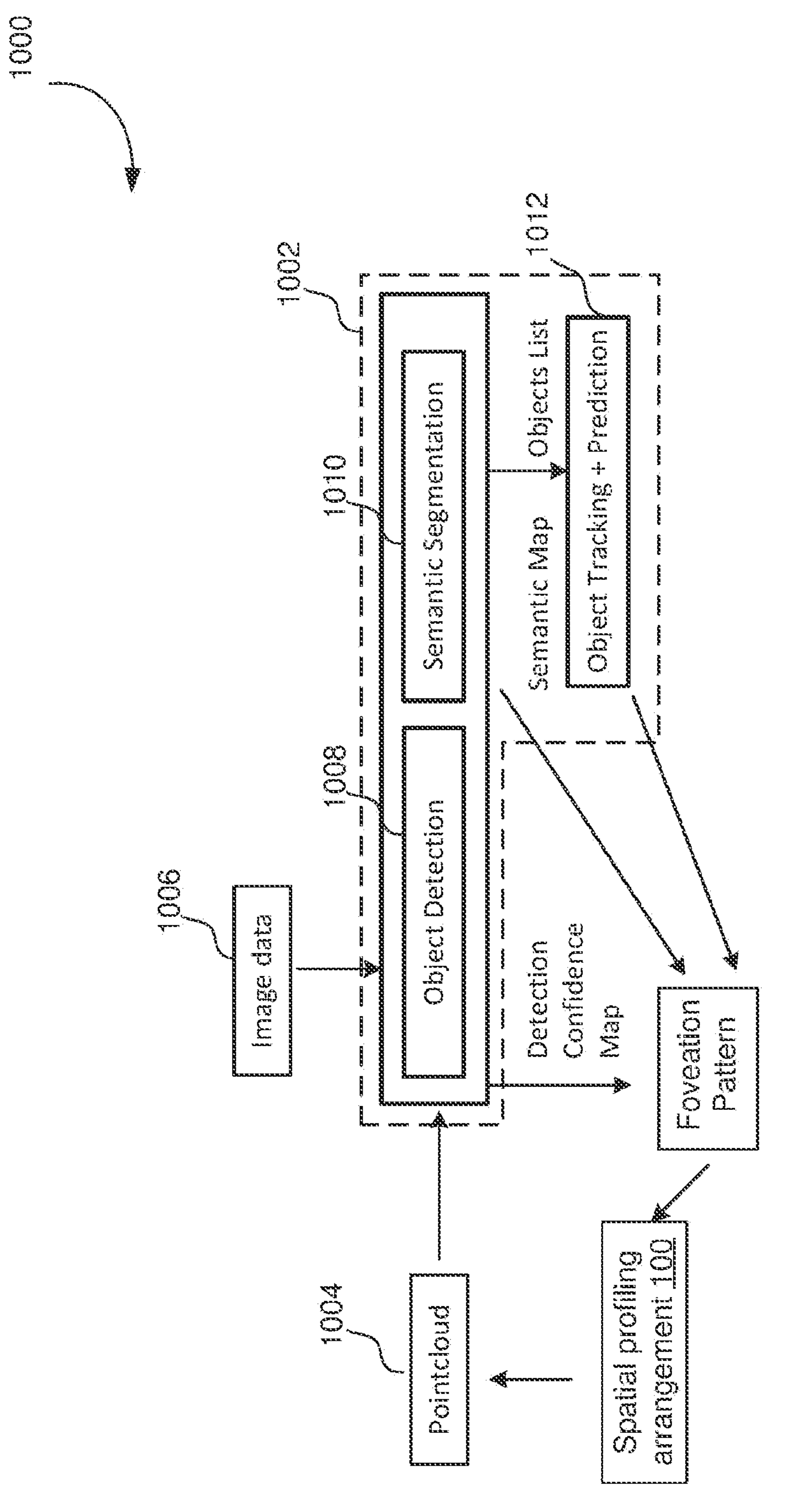
FIG. 10 illustrates an example system for applying a foveation scan pattern to a scan of a spatial profiling arrangement.

FIG. 10 illustrates an example system 1000 for determining a set of user-selectable scan profiles or for selecting one of a set of previously defined scan profiles. The system 1000 includes the spatial profiling arrangement 100 and a processing device 1002. The processing device 1002 may be part of the processing unit 105 or a device in communication with the processing unit 105. In addition, the system 1000 may include one or more image sensors (not shown). The spatial profiling arrangement 100 provides a point cloud 1004 as an output from a previous scan. A point cloud is a set of data points in space, where each data point represents an optically reflective surface of an obstacle encountered by light transmitted by the spatial profiling arrangement 100 into the environment. The point cloud 1004 can be produced by the processing unit 105 of the spatial profiling arrangement 100 based on the light received at the light receiver 104. In some embodiments, this point cloud 1004 is provided as input along with image data 1006 from the one or more sensors to the processing device 1002.

The processing device 1002 includes an object detection module 1008 and a semantic segmentation module 1010. The object detection module 1008 is configured to process the point cloud 1004 and the image data 1006 to detect one or more objects in the environment based on the input data. In addition, in some embodiments, the object detection module 1008 may be configured to generate an uncertainty map—identifying the confidence level with which the object detection module 1008 has identified one or more objects in the environment. It will be appreciated that any suitable object detection algorithm may be employed by the object detection module 1008 to detect objects.

The semantic segmentation module 1010 is configured to link each identified object to a class label, such as person, car, flower, etc. Once the objects are classified, the semantic segmentation module 1010 generates a semantic map, which may be forwarded along with a list of objects identified in the previous scan to an object tracking module 1012. The object tracking module 1012 may be configured to track movement of classified objects from one scan to the next to estimate their distance from the spatial profiling arrangement 100, their velocity and heading, and predict the future positions of the classified objects based on the estimated velocity and heading of the objects. In some techniques, this predicted position of objects may be fed back to the object detection module 1008 to aid the object detection module 1008 in detecting objects in future scans. In addition, the object tracking module 1012 may be configured to receive vehicle data (e.g., from the vehicle on which the spatial profiling arrangement 100 is installed). Vehicle data may include the velocity and heading of the vehicle. Based on the vehicle data and the object tracking data, the object tracking module 1012 may be configured to generate travel prediction maps, which indicate a predicted path of travel for the vehicle.

Using these techniques and modules, the processing device 1002 is perceptive to the environment around a given spatial profiling arrangement 100. For example, it may determine the curvature of the road ahead and whether there is a horizon in the distance. It may determine that there are one or more objects more than 100 meters away or objects that are within close vicinity of the spatial profiling arrangement 100. The angular and/or temporal resolution is then adapted in response to or based on the determination.

Based on this determined environment, the processing device 1002 may be configured to determine a set of user-selectable foveation scan profiles and/or to select from a set of available user-selectable foveation scan profiles to apply to one or more subsequent scans. At least two candidate foveation scan profiles within the set each relate to a common identification (e.g. to identify the horizon, one or more objects, a danger, etc). A candidate foveation scan may be defined by a complete scan pattern (e.g. two-dimensional coordinates for each point) and/or scan parameters (e.g. respective ranges of the vertical and horizontal field of view). The set may include a discrete set (e.g. a fixed set of complete scan patterns) and/or a continuous set (e.g. defined by a continuous range of scan parameters). Some examples of adaptation to an environment of an autonomous vehicle are described below. These or other foveation examples may be applied to other determined environments.

Horizon Profiles

The vision system of a moving vehicle, in particular a LiDAR vision system will often include within its field of view a horizon. At least during some scans it may be required to foveate on the horizon, either a detected horizon and/or an expected location of the horizon applied by the processing unit 105, which was previously determined based on the location and orientation of the field of view relative to the vehicle. This foveation can be achieved by increasing the point density at and around the horizon, for example by having a band of increased point density near a mid-portion of the field of view. In other words the point density may be lower at angles within the field of view away from the horizon in the vertical direction.

Figure 11:
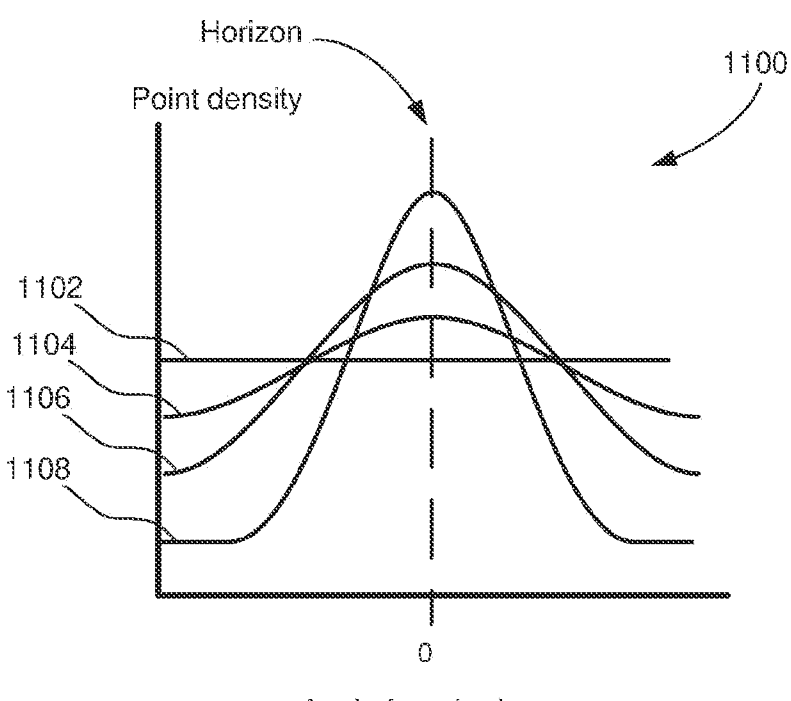
FIG. 11 is a graph illustrating example horizon foveation scan profiles according to some embodiments of the present disclosure.

FIG. 11 illustrates a graph 1100 (not to scale) showing variation in pixel or point density for variation in angles from the horizon. In this graph, the x-axis represents angle from the horizon (0° indicating the horizon) and the y-axis represents point density. Horizontal line 1102 indicates a candidate foveation scan profile where no foveation is applied. In this case, the point density remains constant for all angles from the horizon. Lines 1104, 1106, and 1108 indicate three different levels of foveation applied to the horizon. In particular, line 1104 indicates a candidate foveation scan where the point density is slightly increased near the horizon, with a higher average point density or angular resolution within a portion of the field of view centred than in portions of the field of view more distant to the horizon, line 1106 indicates a candidate foveation scan profile where the point density is almost doubled near the horizon and halved in regions away from the horizon, and line 1108 indicates a candidate foveation scan profile having a bell-like curve where the point density is more than doubled for a small number of angles around the horizon (e.g., ±20°) and then drastically reduced outside this region.

The horizon may be detected from point clouds of earlier scan(s), for example, by the processing device 1002 of FIG. 10 using the techniques described therein. In instances when the horizon is detected, the location of the areas of increased point density may be adapted to “follow” the horizon. The size of the field of view can also be adapted having regard to the detected (and/or expected) horizon, for instance by reducing the vertical field of view to a narrower band about the horizon so as to increase the temporal resolution of a set of scans of the area around the horizon. Foveation and/or limiting the field of view with respect to the horizon may be responsive to one or more events determined by the processing device 1002. An example of such an event may be detection of a new object at the horizon, or detection of a new object at the horizon at a location corresponding to the estimated path of the road ahead (the estimation formed by the object tracking module 1012 based on the point clouds of earlier scans).

By way of example, the spatial profiling arrangement 100 may conduct a first scan or first set of scans without foveation on the horizon. In a second scan or second set of scans, once a horizon is detected, the processing device 1002 may receive a user selection to instruct the spatial profiling arrangement 100 to change to one of the candidate foveation profiles shown in FIG. 11. That foveation profile may be pre-configured whereby the spatial profiling arrangement 100 can switch into and out of a mode with that foveation profile. There may be two or more selectable modes with different foveation profiles, the selection based on one or more variables. Alternatively the foveation profile may be dynamically determined based on one or more variables. For example the variables on which a candidate foveation scan profile is determined may include the speed the vehicle is travelling, the relative speed or velocity, or changes in relative speed or velocity of objects detected within the point could, the planned vehicle path or trajectory, the rate of change of the detected horizon or the detection of new objects. Other variables may be used to achieve a responsiveness criteria of the system to certain events.

Distance-Based Profiles

The vision system of a moving vehicle, in particular a LiDAR vision system often includes within its field of view one or more objects at varying distances from the vehicle. Objects that are closer to the vehicle can be detected with a coarse resolution, but objects that are further away from the vehicle may require a finer resolution so that the objects can be easily detected and identified. Accordingly, in some examples, the processing device 1002 may apply different foveation profiles based on the relative distance of objects from the vehicle. This foveation can be achieved by increasing the point density at and around objects that are detected to be further away from the vehicle and/or by reducing the point density at and around objects that are detected to be closer to the vehicle.

Figure 12:
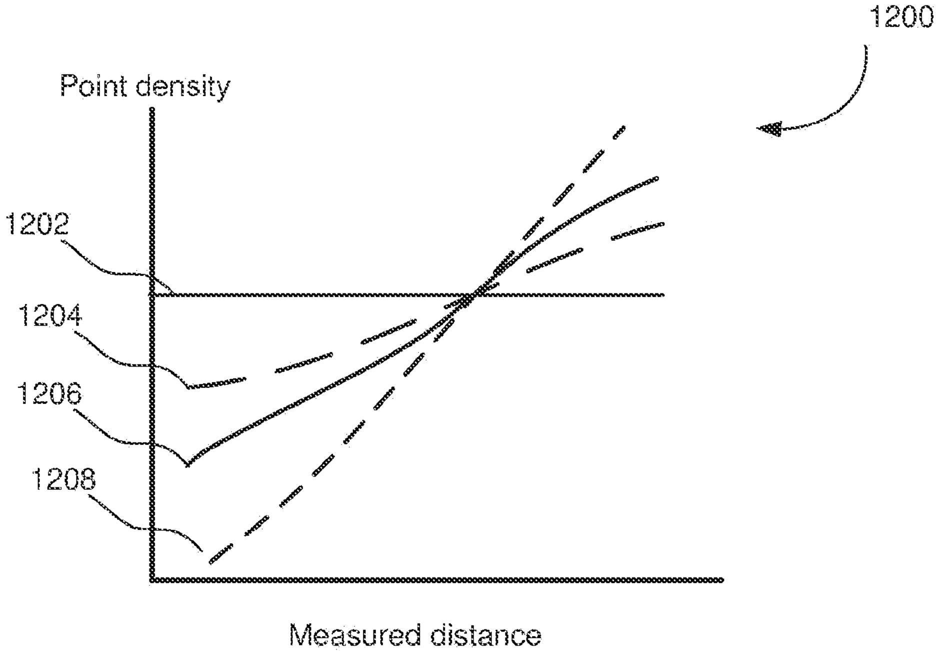
FIG. 12 is a graph illustrating example distant-based foveation scan profiles according to some embodiments of the present disclosure.

FIG. 12 illustrates a graph 1200 showing variation in pixel or point density for variation in distance from the vehicle. In this graph, the x-axis represents distance from the vehicle and the y-axis represents point density. Horizontal line 1202 indicates a candidate foveation scan profile where no foveation is applied. In this case, the point density remains constant for all distances from the vehicle. Lines 1204, 1206, and 1208 indicate three different levels of foveation applied based on distance from the vehicle. In particular, line 1204 indicates a candidate foveation scan profile where the point density increases gradually—it is slightly decreased in regions closer to the vehicle and increased slightly as the distance from the vehicle increases. Lines 1206 and 1208 indicate more aggressive candidate foveation scan profiles where the spatial profiling arrangement 100 is progressively more focused on far away objects.

The distance of obstacles from the vehicle may be detected from point clouds of earlier scan(s), for example, by the processing device 1002 of FIG. 10 using the techniques described therein. Further, foveation and/or limiting the field of view with respect to distance may be responsive to one or more events determined by the processing device 1002. An example of such an event may be detection of a new object far away from the vehicle, or detection of a new object far away from the vehicle at a location corresponding to the estimated path of the road ahead (the estimation formed by the object tracking module 1012 based on the point clouds of earlier scans).

By way of example, the spatial profiling arrangement 100 may conduct a first scan or first set of scans without foveation. In a second scan or second set of scans, once objects are detected and their relative distances from the vehicle are determined, the processing device 1002 may receive a user selection to instruct the spatial profiling arrangement 100 to change to one of the candidate foveation profiles shown in FIG. 12. That foveation profile may be pre-configured whereby the spatial profiling arrangement 100 can switch into and out of a mode with that foveation profile. There may be two or more selectable modes with different foveation profiles, the selection based on one or more variables. Alternatively the foveation profile may be dynamically determined based on one or more variables. For example the variables on which a foveation profile is detected or determined may include the speed the vehicle is travelling, the relative speed or velocity, or changes in relative speed or velocity of objects detected within the point cloud, the planned vehicle path or trajectory or the detection of new objects. Other variables may be used to achieve a responsiveness criteria of the system to certain events.

Region Profiles

In some examples, the processing device 1002 may apply foveation based on the classification of objects. For example, if it is determined that an environment includes trees, mountains, a road, one or more vehicles, and a road sign, it may be beneficial to increase the point density around the one or more vehicles and the road sign. Point density around other objects, such as trees and the mountains on the other hand can be decreased as they form part of the background. This type of foveation can be achieved by defining a bounding box or region of interest around the identified objects that need to be foveated and increasing the point density within these bounding boxes or region(s) of interest while reducing the point density in other regions.

Figure 13:
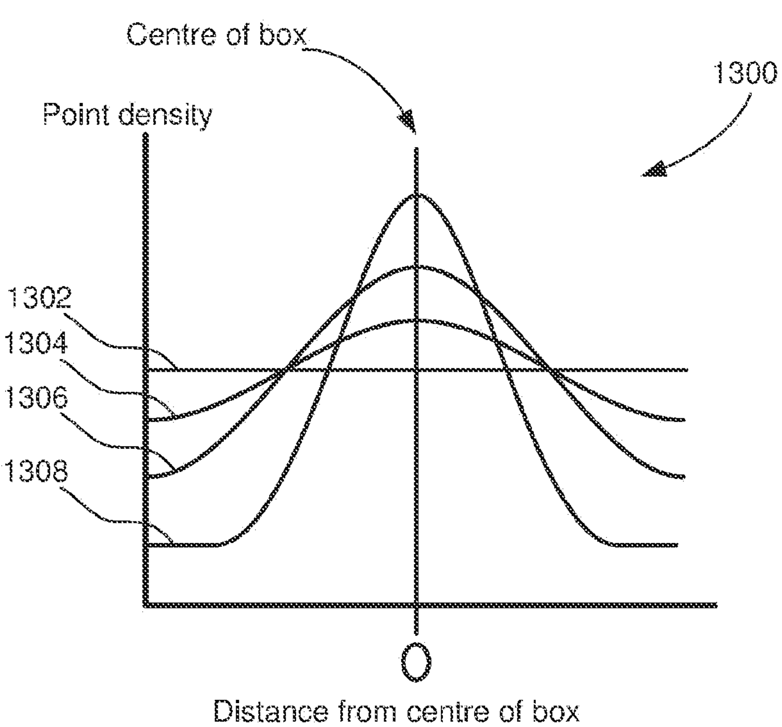
FIG. 13 is a graph illustrating example region foveation scan profiles according to some embodiments of the present disclosure.

FIG. 13 illustrates a graph 1300 showing variation in pixel or point density for distance from the centre of a particular bounding box. In this graph, the x-axis represents distance from the centre of the box (0 indicating the centre of the box) and the y-axis represent point density. Horizontal line 1302 indicates a candidate foveation scan profile where no foveation is applied. In this case, the point density remains constant for all regions. Lines 1304, 1306, and 1308 indicate three different levels of user-selectable foveation applied to the bounding box and these differ by point density as a function of distance from the centre of the box. In particular, line 1304 indicates a candidate foveation scan profile where the point density is slightly increased at the centre of the box and gradually decreases as distance from the centre of the box increases. Line 1306 indicates a candidate foveation scan profile where the point density decreases more sharply as distance from the centre of the box increases and line 1308 indicates a candidate foveation scan profile having a bell-like curve where the point density drastically reduces as the distance from the centre of the box increases.

In instances when objects are detected and identified by the processing device 1002, the location of the regions of increased point density may be adapted to “follow” the identified objects. Foveation and/or limiting the field of view with respect to the identified objects may be responsive to one or more events determined by the processing device 1002. An example of such an event may be detection/identification of a new object of interest (e.g., a person, a vehicle, a road sign, a traffic signal, etc), detection of a moving object, or detection of a new object.

By way of example, the spatial profiling arrangement 100 may conduct a first scan or first set of scans without any foveation. In a second scan or second set of scans, once one or more objects are detected and classified, the processing device 1002 may identify one or more of these objects as an object of interest and may determine the size of a bounding box around the object of interest. Subsequently, the processing device 1002 may receive a user selection to instruct the spatial profiling arrangement 100 to change to one of the candidate foveation scan profiles shown in FIG. 13. That foveation profile may be pre-configured whereby the spatial profiling arrangement 100 can switch into and out of a mode with that foveation profile. There may be two or more selectable modes with different foveation profiles, the selection based on one or more variables. Alternatively the foveation profile may be dynamically determined based on one or more variables. For example the variables on which a foveation profile is detected or determined may include the speed the vehicle is travelling, the relative speed or velocity, or changes in relative speed or velocity of objects detected within the point could, the planned vehicle path or trajectory, the rate of detection of new objects. Other variables may be used to achieve a responsiveness criteria of the system to certain events.

Confidence Profiles

In some cases, the processing device 1002 and specifically the object detection and segmentation modules may be unable to identify objects with high confidence. For example, it may not be able to confidently identify small objects or objects that are farther away from the vehicle correctly using standard scan resolutions. Accordingly, in some examples, the processing device 1002 may apply different foveation profiles to scans based on the confidence levels of identified objects from previous scans. This foveation can be achieved by increasing the point density at and around objects that were previously detected with lower confidence and by reducing the point density at and around objects that were previously identified with higher confidence.

Figure 14:
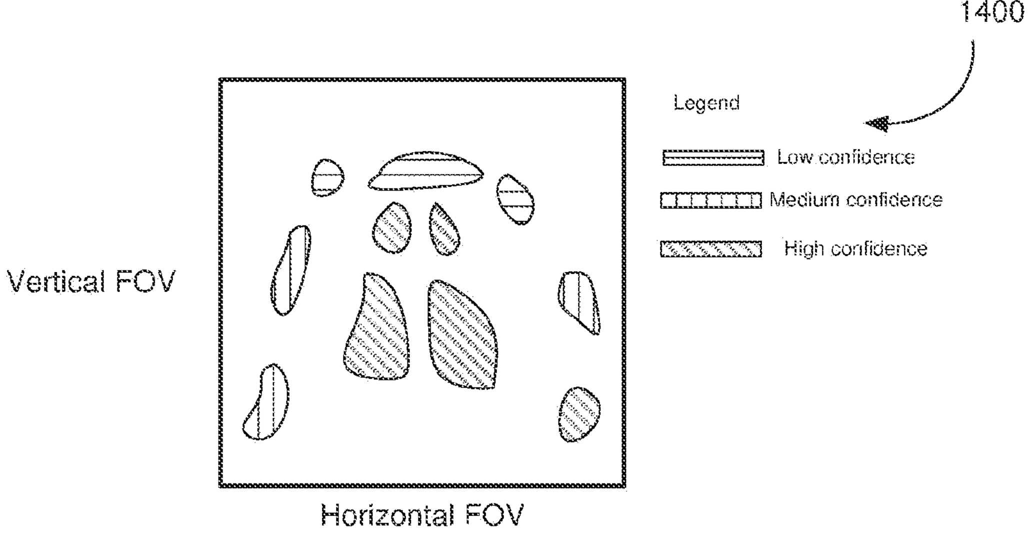
FIG. 14 is an uncertainty map illustrating example confidence levels in detecting objects in an environment according to some embodiments of the present disclosure.

The confidence levels of identified or classified objects may be determined by the processing device based on point clouds of earlier scan(s), for example, by using a suitable object recognition algorithm. Based on this determination, the processing device 1002 may generate an uncertainty map or image—i.e., a map or image showing regions or objects identified with low, medium or high confidence. FIG. 14 illustrates an example uncertainty map 1400. In this case, the point cloud from a previous scan is utilized by the processing device 1002 to detect and classify objects. Objects that are detected and identified with low confidence are indicated by the red regions, objects that are detected and identified with medium confidence are indicated by the yellow regions and objects that are detected and identified with high confidence are indicated by the green regions in this map 1400.

In this example, based on this uncertainty map, the processing device 1002 may receive a user selection to instruct the spatial profiling arrangement 100 to increase the point density in regions identified as low confidence regions by X (where X is selectable from a continuous variable set) and decrease the point density in regions identified as high confidence regions correspondingly.

Further, foveation and/or limiting the field of view with respect to these confidence regions may change from one scan to the next—e.g., as objects are identified with higher confidence (e.g., because of the foveation), the uncertainty map may change and the processing device 1002 may receive a user selection to instruct the spatial profiling arrangement 100 to change its foveation profile accordingly.

Danger Profiles

In some cases, the processing device 1002 and specifically the object detection and segmentation modules may identify areas of the environment (such as the road) that are to be traversed by the vehicle or areas of the environment (such as sidewalks) that may intersect with a predicted vehicle path. These areas may require finer resolution or higher point density as opposed to other areas of the environment. Accordingly, in some examples, the processing device 1002 may apply different a foveation profile to scans based on the identified areas where the vehicle is predicted to travel or that may intersect with the travel path of the vehicle. This foveation can be achieved by increasing the point density at and around the identified areas and by reducing the point density at and around other areas.

Figure 15:
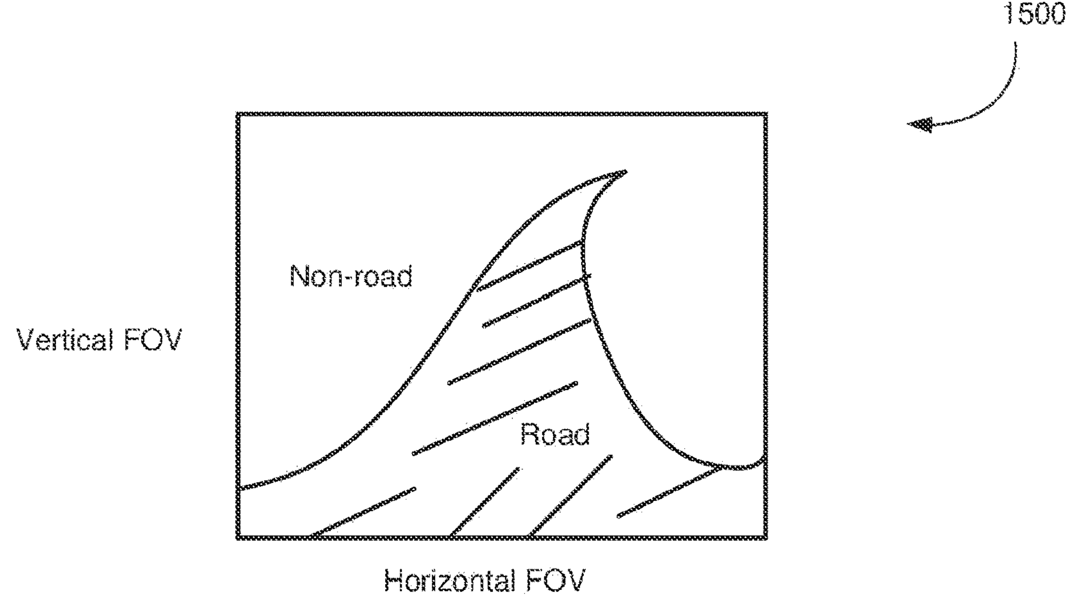
FIG. 15 is a predicted travel map illustrating highlighted regions for foveation according to some embodiments of the present disclosure.

In certain embodiments, the areas of vehicle travel or intersection with vehicle path may be identified by the processing device 1002 based on the point clouds from previous scans, the vehicle's predicted travel path, current velocity and heading. Based on this identification, the processing device 1002 may generate a predicted travel map or image—i.e., a map or image showing areas where the vehicle is predicted to travel and/or areas of the environment that are predicted to intersect with the vehicle's predicted path. FIG. 15 illustrates an example predicted travel map 1500. In this case, the point cloud from a previous scan is utilized by the processing device 1002 to detect and classify objects. Further, information about the vehicle (e.g., velocity and heading) is utilized by the processing device 1002 to determine the predicted areas of travel and identify any objects that may intersect with the predicted areas of travel. In this map, the identified areas are highlighted.

In this example, based on this predicted travel map, the processing device 1002 may receive a user selection to instruct the spatial profiling arrangement 100 to increase the point density in the identified areas by X (where X is selectable from a continuous variables set) and decrease the point density in other areas of the field of view correspondingly.

Custom Profiles

In addition to the foveation profiles described above, operators may define their own maps or images that combine any number of the above-defined profiles to create their own foveation profiles. In particular, an operator may define a new profile and store data defining the new profile in computer readable storage so as to be available for selection to control the spatial profiling arrangement 100. The processing device 1002 may then be configured to analyse point clouds from previous scans and the preset foveation profile to direct the spatial profiling arrangement 100 to adjust its point density accordingly.

In some embodiments the spatial profiling arrangement 100 may cycle through different foveation configurations. In other words, the change in foveation is not dependent on detection of a specific event and is not fixed, but changes with time according to a predetermined or adaptive timing interval. For example, the processing unit 105 may control the arrangement to have no foveation for one scan or set of scans, to foveate on the horizon for a second scan or set of scans and to foveate based on confidence for a third scan or set of scans.

Example Process

Figure 16:
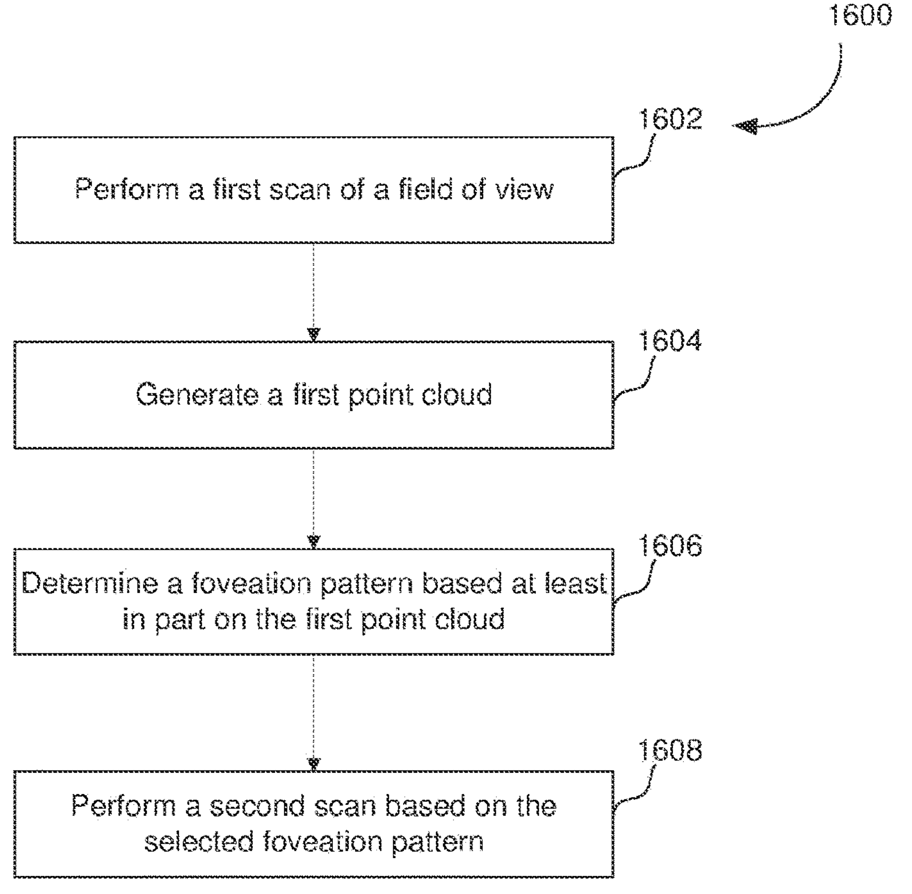
FIG. 16 is a process for applying a foveation scan pattern to a scan of a spatial profiling arrangement according to some embodiments of the present disclosure.

FIG. 16 is a flow diagram generally representing processing that may be performed by the system of FIG. 10.

At step 1602, the spatial profiling arrangement 102 may perform a first scan of a field of view. In some embodiments, this scan may be performed by sweeping through a first set of wavelengths. In one example, this may include performing a scan by sweeping through all the available wavelength channels $\lambda_1, \lambda_2, \ldots \lambda_N$ present in a scan or sweep of the light source 102.

Next, at step 1604, a first point cloud may be generated. In one embodiment, reflected light may be detected (e.g., by the light receiver 104) and communicated to the processing unit 105 for processing. The processing unit 105 may generate the point cloud based on processing the reflected light signals.

Once the point cloud is generated, it may be communicated to the processing system 1002 for further processing. For example, the processing system 1002 may utilize the point cloud to detect and classify objects, and/or to create one or more maps such as a semantic map, an uncertainty map, a predicted travel map, or a custom map. To create one or more of these maps, the processing system 1002 may receive additional data such as vehicle data from one or more external sources.

Next, based on the detected and classified objects and/or maps, the processing device 1002 may determine a set of candidate foveation scan profiles for user selection to be applied on the one or more subsequent scans at step 1606. For example, if the point cloud of the previous scan shows one or more objects on a vehicle's predicted travel path, near the horizon, that have been identified with low confidence the processing device 1002 may determine a set of candidate scan profiles which include a combination of horizon profiles that differ by point density near the identified horizon, region profiles that differ by point density around the identified object and confidence profiles that differ by point density around the identified region of specific confidence. Alternatively, if no objects are identified in the vehicle path, but a horizon is identified, the processing device 1002 may determine a set of candidate scan profiles which include horizon foveation profiles that differ by point density near the identified horizon. In another example, if the processing device 1002 has identified an object with low confidence, it may identify a region around the object and determine a set of candidate scan profiles which include confidence foveation profiles that differ by point density around the identified region of specific confidence.

The processing unit 105 then receives or makes a selection from the set of candidate foveation scan profiles. As described above, the received selection may be by a user system (e.g. an autonomous driving system) that utilises the spatial profiling arrangement 100. It will be appreciated, therefore, that the selection may be made in response to the environment (e.g. road conditions).

At step 1608, a second scan may be performed based on the user-selected foveation profile. In the second scan, point density of the sweep may be varied based on the point density variations indicated by the foveation profile. In one embodiment, in areas of field of view where high point density is indicated, the number of pulses per frame and/or the wavelength of the pulses is distributed so that more pulses are directed within that area. Similarly, in areas of the field of view where low point density is indicated, the number of pulses per frame and/or the wavelength of the pulses is distributed so that less pulses are directed within that area.

This process 1600 is continuously repeated such that point clouds from a previous scan is utilized to select a foveation pattern for a next scan.

As described hereinabove, a user system can select one or more predefined foveation scan patterns to fine tune the manner in which a spatial profiling arrangement scans a field of view such that regions of interest may be scanned more finely. Further, a foveation pattern can be selected on a frame-by-frame basis and in some embodiments a foveation pattern can be selected on a line-by-line basis (i.e. selected or selectable for each scan across a dimension, with the other dimension, if any, remaining constant) or on a segment by segment basis (i.e. selected or selectable for groups of scans across a dimension, with the other dimension, if any, remaining constant).

Alternatively or additionally to the process 1600 in which the user selection is by an associated system to the spatial profiling arrangement (e.g. an autonomous driving system), one or more foveation profiles may be specified or selected manually or otherwise, and fixed at installation of the spatial profiling arrangement 100. For example, manual selection may be used to include a required tolerance for variations in mounting angles or correct for variations in mounting angle of the spatial profiling arrangement 100. A method of installation therefore includes installing an embodiment of the spatial profiling arrangement 100, determining its field of view and setting or selecting one or more foveation profiles based on the determined field of view.

Figure 17:
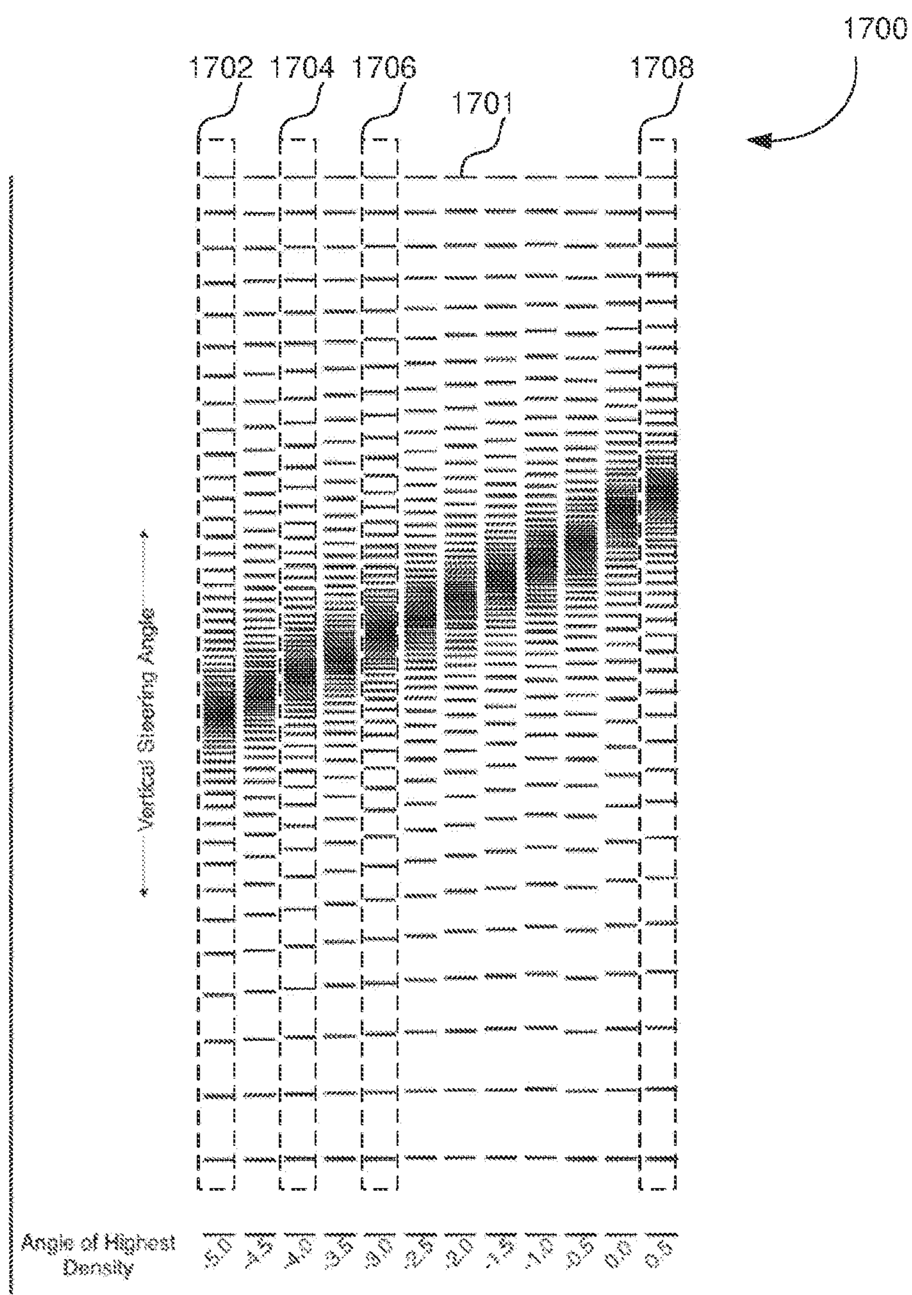
FIG. 17 illustrates an example set of predetermined scan profile.

FIG. 17 illustrates an example set of scan profiles 1700 of a spatial estimation system. One or more of the scan profiles 1700 may be provided by an embodiment of the spatial profile arrangement 100, for example selectable by a user system of the spatial profile arrangement 100 or by the spatial profile arrangement 100 itself (e.g. with a selection procedure implemented by the processing unit 105). Data defining the scan profiles 1700 may be stored in computer readable storage accessible to the processing unit 105 and/or accessible to a user system for communication to the processing unit 105.

In FIG. 17, each horizontal dash (e.g. dash 1701) represents a vertical steering angle at which light from the light source 102 is directed. Each horizontal dash may therefore correspond to a measurement or potential measurement of the environment by the spatial estimation system, or a pixel of the spatial estimation system. In embodiments in which the vertical dimension is controlled by wavelength steering, then each dash represents a wavelength of light that has been directed by the beam director. Accordingly, different dashes in a column represent different wavelengths and horizontally aligned dashes in FIG. 17 represent light at the same wavelength. In embodiments in which the vertical dimension is controlled by mechanical steering, then in FIG. 17 different dashes in a column represent different positions of the mechanical steering arrangement and horizontally aligned dashes represent the same position of the mechanical steering arrangement.

As illustrated, the scan profile 1700 includes a set of profiles (e.g. 1702, 1704, 1706, 1708), which are represented by the columns in FIG. 17. Each profile in this example is vertically compressed in two respects, there is an area of high compression at a mid-point in the vertical range of the field of view and there is higher compression towards the upper ranges of the vertical range in comparison to the lower ranges. Each vertically compressed pattern covers the same vertical FOV (i.e. the same vertical steering angle, in this example about 30 degrees) and has the same or substantially the same number of light emission angles (i.e. the same number of pixels), but differs from one another in the distribution of point density, including in particular by the vertical angle at which the point density is the highest (which may be called the foveation angle). In this example, the foveation angles range from −5 degrees to +0.5 degrees (in steps of 0.5 degrees). The zero degree angle is an arbitrary reference. In one example, the zero degree angle may correspond to the horizontal direction from the centre of the aperture of the beam director.

In other embodiments with a foveation ability, there need not be a specific angle of highest density. For example, there may be a region of higher density and within that region the density may be substantially uniform or may have variations within it creating a plurality of angles of local minima and maxima in density. In these embodiments the foveation angle may be with reference to the region of higher density, for example a mid-point of the region.

The scan profiles 1700 and other scan profiles with variable vertical foveation angles may be used to track or otherwise accommodate an aspect of the environment with a variable vertical position relative to the field of the view of the spatial profiling arrangement 100, the horizon for example in a LiDAR vision system of a moving vehicle. The foveation angles are mostly negative in this example, which may correspond to a use case of a LiDAR vision system installed near the top of a vehicle, so that it emits outgoing light slightly downwardly towards the road, with the horizon usually sitting below 0 degree. It will be appreciated that the range of foveation angles in the set may accommodate variations in the mounting height and/or angle of the beam director of the spatial profiling arrangement and/or changing road conditions, such as the road ahead sloping up or down. Additionally, as mentioned above, the scan profiles 1700 have higher density at the upper vertical angles in the field of view in comparison to the lower vertical angles. An example use case of this may again be a LiDAR vision system installed on a vehicle, with the upper vertical angles expected to scan at greater distances, so therefore angle differences have a greater effect on the separation at the point of reflection. The difference in separation of pixels between generally closer objects (e.g. the road immediately in front of the vehicle) and generally distant objects (e.g. those around or above the horizon) may therefore be controlled, for example reduced, by controlling the relative point density.

A spatial estimation system may also control another steering angle, for example the horizontal steering angle, in combination with the control over the vertical steering angle represented in FIG. 17. For example, the spatial estimation system may select the scan profile 1702 for one or more scan iterations across the horizontal field of view and select scan profile 1708 for one or more subsequent scan iterations. In some embodiments the scan profile is fixed for each scan iteration of a field of view, so that for example the vertical position of the area of foveation remains constant for each scan iteration. In other embodiments the scan profile of at least one dimension, potentially both dimensions is controllably variable within a scan iteration, allowing different vertical positions of the area of foveation at different horizontal steering angles within a single scan.

Although FIG. 17 shows the scan patterns in vertically aligned columns, this is not intended to imply that corresponding light from the beam director at different vertical steering angles are necessarily vertically aligned. Whilst light from the beam director at different vertical steering angles may be aligned, an example is when a tilting mirror with a horizontal tilting axis, there may also be some horizontal variation. It will also be appreciated that the use of the vertical steering angle in FIG. 17 is an example and that a compressed pattern may be applied to other dimensions, in particular to the horizontal dimension (with or without a vertical component).

Figure 18:
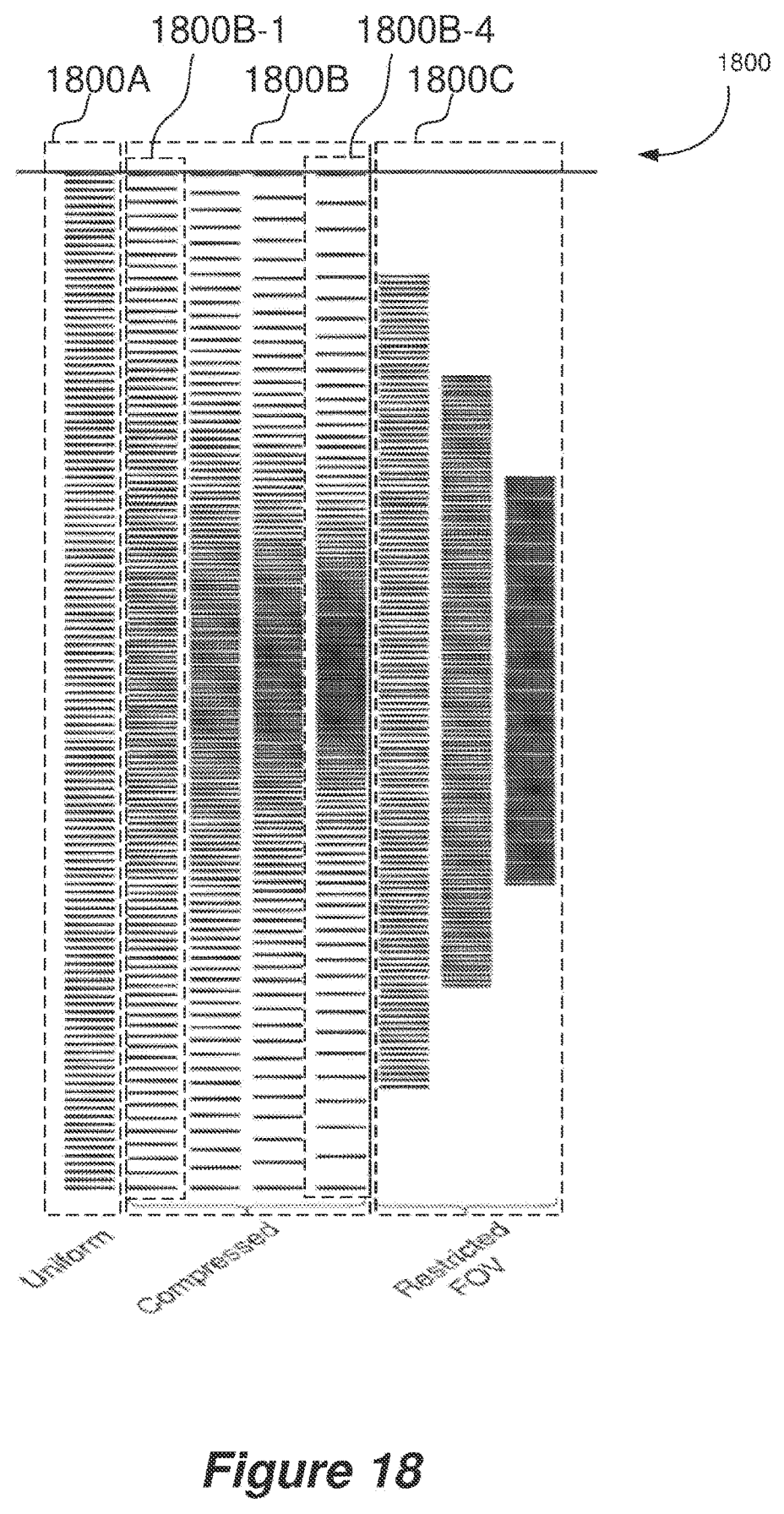

FIG. 18 illustrates another example set of scan profiles 1800 of a spatial estimation system. One or more of the scan profiles 1800 may be provided by an embodiment of the spatial profile arrangement 100, for example selectable by a user system of the spatial profile arrangement 100 or by the spatial profile arrangement 100 itself. Like FIG. 17, each horizontal dash represents a steering angle, which may be for example a vertical steering angle or a horizontal steering angle. A set of selectable scan profiles of a spatial estimation system may include one or more scan profiles 1700 and one or more scan profiles 1800, and/or variations thereof, and optionally other scan profiles.

The scan profile 1800A represents a uniform scan profile, with no foveation. The four scan profiles 1800B represent scan profiles with different levels of compression at the same foveation angle. The level of compression increases left to right in FIG. 18, i.e. scan profile 1800B-1 illustrates the least compressed scan profile while scan profile 1800B-4 illustrates the most compressed scan profile. The three scan profiles 1800C represent scan profiles with reduced vertical FOV (e.g. reduced vertical steering angle), the field of view reducing left to right in FIG. 18.

As compared to the uniform scan profile 1800A, each of the non-uniform scan profiles 1800B has increased density at some angles and decreased density at other angles. Each of the non-uniform scan profiles 1800C with reduced FOV also has denser points at some angles but no points at other angles. The number of pixels may therefore be the same in scan profile 1800A and each of the scan profiles 1800B and 1800C.

Maintaining a constant number of pixels across different scan patterns may allow for a uniform or constant temporal resolution. For example, in spatial estimation systems in which there is a fixed or constant rate of generation of light for a pixel, such as a pulsed laser system, it will take the same amount of time to perform a scan iteration with each of the profiles of FIG. 18. Additionally, the spatial profiling arrangement 100 has a maximum detection range R (for example, limited by the maximum output optical power of the outgoing light), which has an associated round trip time that the spatial estimation system needs to accommodate ($t_{RT}$, $t_{RT}=2R/c$, wherein c is the speed of outgoing light). In this regard, the number of points per second (PPS) is limited ($PPS=1/t_{RT}=c/(2R)$). For example, for a detection range (R) of 250 m, $t_{RT}$ is about 1.667 μs and the points per second is limited as 600,000.

The variable angle of foveation described by way of example with reference to FIG. 17 may be combined with the variable point density described with reference to FIG. 18 to create more profiles. For example, one or more of the compressed profiles 1800B may be one of a set of profiles, the set having profiles with the same compression profile, but at different foveation angles. Similarly one or more of the restricted field of view profiles 1800C may be one of a set in which the restricted field of view is provided at different angles. Further scan profiles combine a restricted field of view with a level of compression in a region. Still further scan profiles include two or more regions of compression and/or two or more angularly separated fields of view.

In embodiments of spatial estimation system having a two-dimensional field of view with a plurality of scanning mechanisms, variations in the scan pattern may be effected by one scanning mechanism and not another of the scanning mechanisms. In embodiments of spatial estimation system having a two-dimensional field of view including a faster scanning mechanism and a slower scanning mechanism, variations in the scan pattern may be effected by the faster scanning mechanism and not the slower scanning mechanism. For example, wavelength based steering may be faster than mechanical steering and therefore scanning profiles may be effected by wavelength control, rather than control over a physical steering mechanism. This may have the added advantages of reduced moving parts with potential gains in reliability and/or longevity.

Figure 19:
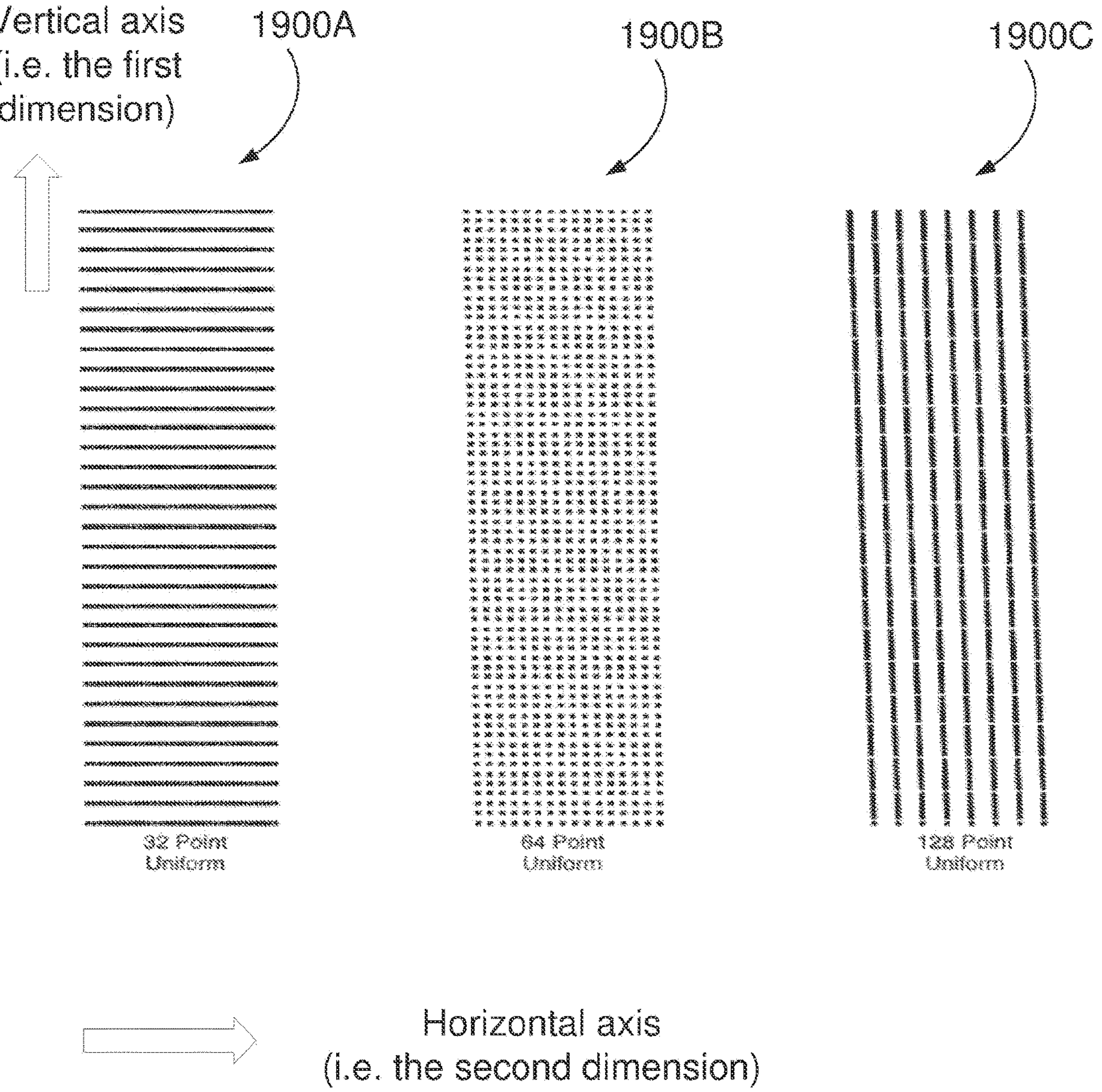
FIG. 19 illustrates example scan profiles showing a point density trade-off between two dimensions.

Alternatively, the scanning profiles may have variations across both dimensions. FIG. 19 illustrates example scan profiles 1900A, 1900B and 1900C showing a vertical (i.e. a first dimension) and horizontal (i.e. a second dimension) point density trade-off. As illustrated, the scan profile 1900A has 32 pixels vertically and 32 pixels horizontally over the FOV. As the point density along the vertical axis increases to 64 points in the scan profile 1900B and to 128 points in the scan profile 1900C, the point density along the horizontal axis decreases from 32 points (as in the scan profile 1900A) to 16 points (as in the scan profile 1900B) and 8 points (as in the scan profile 1900C), respectively. In the examples where the scan profile along the vertical axis is achieved by wavelength steering and the scan profile along the horizontal axis is achieved by mechanical steering (e.g. through rotating the at least one of the diffractive elements as in FIGS. 8A-8C), the point density along the horizontal axis may correspond to the number of mechanical steering angles (i.e. 32, 16 and 8 mechanical steering angles resulting in the scan profiles 1900A, 1900B and 1900C, respectively).

It will be appreciated that the variations in point density as between dimensions, as described with reference to the examples of FIG. 19, may be combined with the variations in angle of foveation and/or point density described with reference to FIGS. 17 and 18. Taking for example the scan profile 1900A, the lines of horizontal pixels may have a non-uniform distribution vertically and/or may be compressed or expanded into a small or larger field of view respectively. Like variations may be made to the scan profiles 1900B and 1900C. These variations may be added to a set of selectable profiles of a spatial estimation system.

Figure 20:
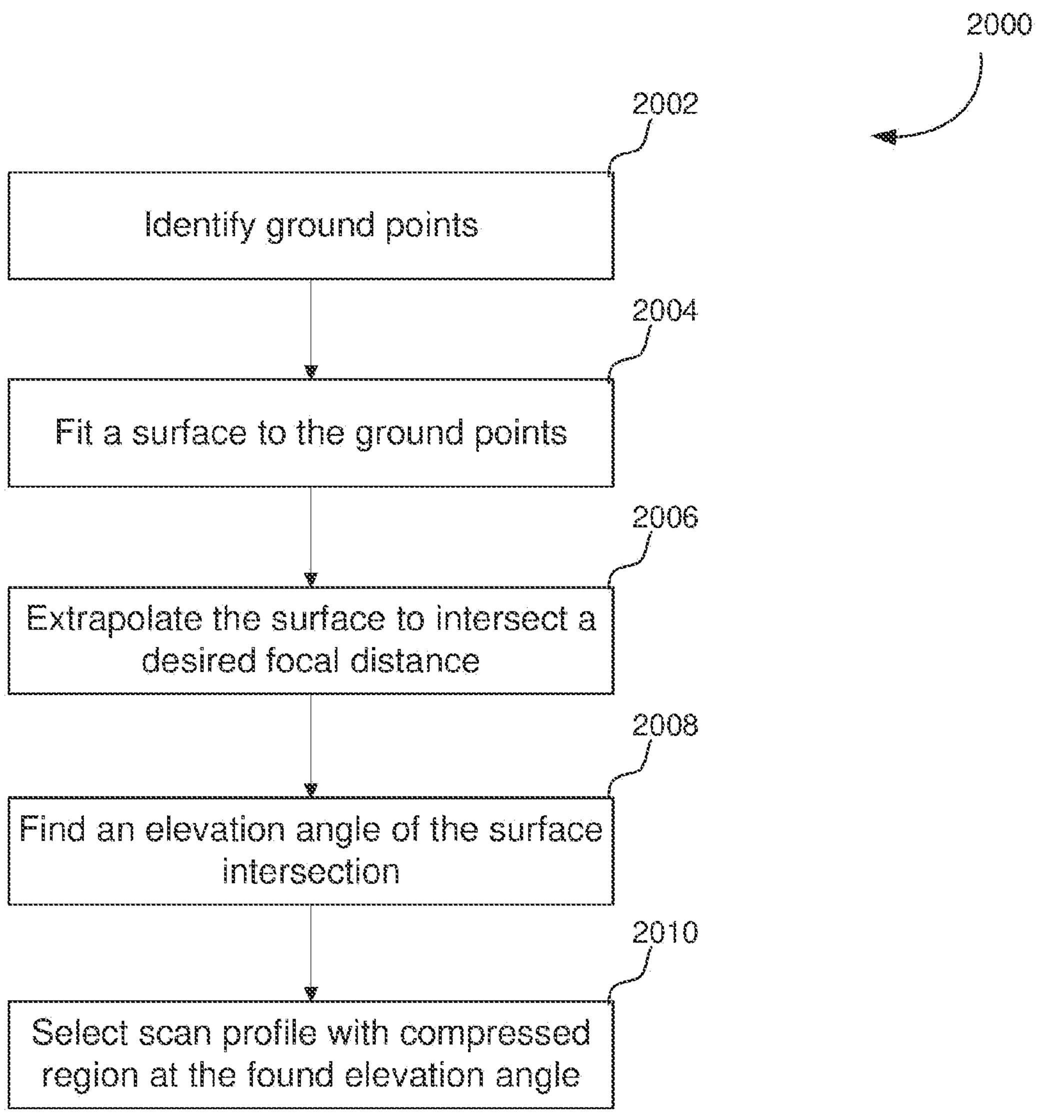
FIGS. 20-22 are examples of process for automatically selecting a scan profile from a predetermined set of scan profiles.
Figure 21:
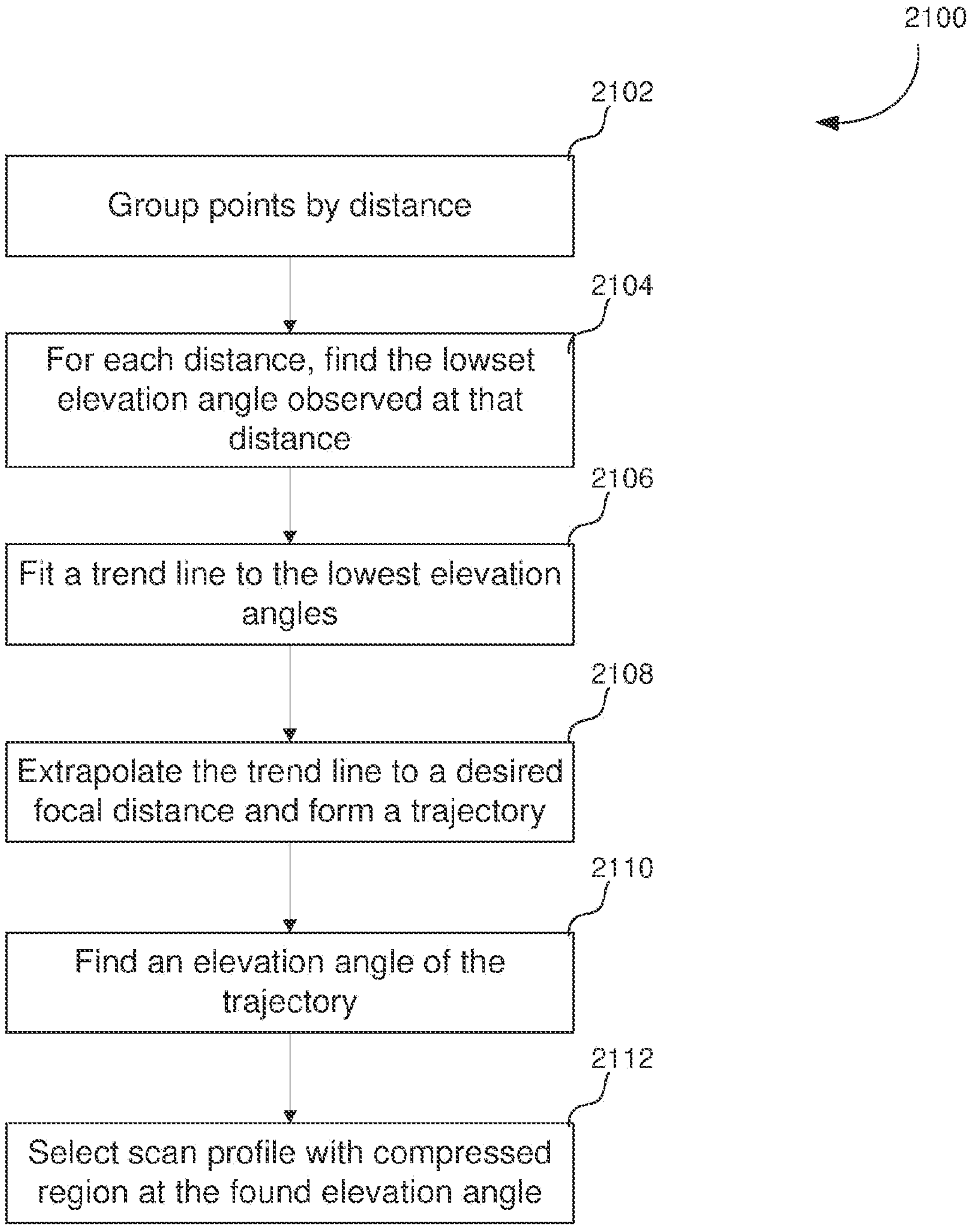
Figure 22:
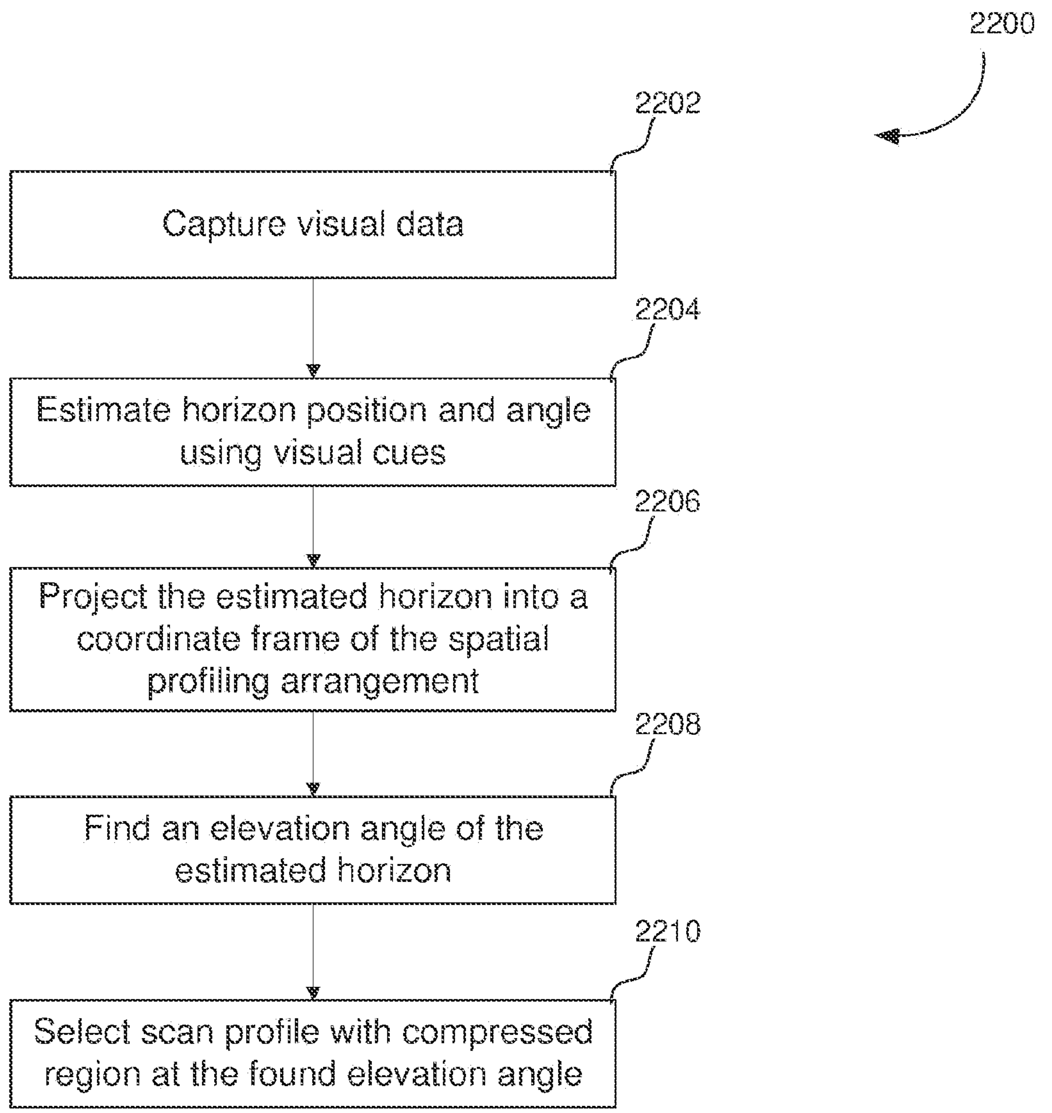

FIGS. 20-22 describe example processes for selecting a scan profile, any one or more of which may be implemented in a spatial estimation system, for example an embodiment of the spatial estimation system 100 and the following description is made primarily with reference to this example. The selection of the scan profile in some embodiments is from a predefined set of scan profiles. The selection may be made according to a computational selection process by a processing device of a spatial estimation system, for example, by a processing device in an autonomous driving system according to a procedure or by a processing device of the spatial estimation system (e.g. a processing device in the processing unit 105 of the spatial estimation system 100), or by a combination of processing devices in communication with each other. In some embodiments the selection is made by a processing unit of a spatial estimation system based on data received from an autonomous driving system. An example procedure is one to locate and/or track an aspect of the environment, for example to locate and track the horizon.

In one example process 2000 as shown in FIG. 20, ground points are identified at step 2002. The ground points are identified based on the direction and range measurements from the spatial estimation system 100. In one example the ground points identified in process 2002 are those proximate to the beam director 103 of the spatial estimation system 100. For instance, the ground points may be all or a selection of the lowest pixels at which return light is detected within a region of about 5 metres to about 100 metres (or any amount in between) in front of the bean director 103.

A surface is then fitted to the identified ground points at step 2004. For example best fit planar surface may be fitted to the identified ground points using an error minimisation algorithm, such as performing least squares regression or otherwise. Other techniques to fit a planar surface may be used and in other embodiments the surface fitted to the ground points is not planar, allowing a closer fit to the surrounding terrain.

At step 2006, the surface is extrapolated to intersect with a desired focal distance. The desired focal distance may a constant, for example 200 metres. In other embodiments the desired focal distance is a variable, for example a variable based on input of a speed of travel of a vehicle carrying the spatial estimation system 100. The desired focal distance may increase with increasing speed, to reflect the increased distance required to stop or otherwise react to obstacles appearing in the field of view, and decrease with decreasing speed. Other variables may affect the desired focal distance, for example data indicating road conditions, data indicating a weight of the vehicle and/or data indicating a stopping distance of the vehicle.

An elevation angle of the surface intersection is then found at step 2008. The determination of the elevation angle may be based on the extrapolated surface. Taking the example of a planar fitted surface, the angle of the extrapolated planar surface relative to a reference angle of the spatial estimation system (e.g. horizontal based on its orientation) is known or determinable and the desired focal distance is known. The elevation angle is then determinable by trigonometric calculation. The relevant processing devices may or may not perform the calculation, as a substitute such as look-up tables may be used instead of a calculation.

At step 2010, the scan profile with a compressed region at the found elevation angle is selected. Examples of scan profiles with compressed regions were described with reference to FIGS. 17 and 18. In some embodiments the scan profiles available for selection comprise two or more angularly adjacent or overlapping compressed regions, so that the determined elevation angle does not fall within a gap between profiles in which there is not a compressed region. If there is a gap between compressed regions of selectable profiles, then a selection process may determine a scan profile with a closest compressed region or may forego selecting a profile with a compressed region and use a uniform scan profile. In other embodiments the scan profile is not constrained to a selection of options and is determined based on the found elevation angle and the beam director 103 controlled to provide a compressed region in accordance with the determined scan profile. Spatial estimation for at least one scan iteration is then performed using the selected or determined scan profile.

In another example process 2100 as described in FIG. 21, a set of data points in space is first grouped by distance at step 2102. For example, the pixels determined within or at 1 metre intervals up to a threshold distance of for example between 5 and 100 metres (or any distance in between) may be identified as groups. In some embodiments the pixels across the entire field of view of beam director 103 are grouped. In other embodiments the pixels across a subset of the field of view are grouped, for example a central portion which may correspond to the area directly in front of the vehicle or correspond to a narrower angular range in front the vehicle than the full angular range across the field of view. Further, in some embodiments all pixels within or at the range intervals are determined to be in the associated group, whilst in other embodiments less than all pixels are determined to be in the group, for example every second pixel or every tenth pixel, to reduce the computational time or resources required for the process 2100.

For each distance group, the lowest elevation angle observed at that distance is found at step 2104. Data filtering or other techniques may be applied to remove or reduce the effect of any outlier data, for example by filtering out pixels that are more than a threshold distance below their adjacent pixels, by using moving averages, or otherwise.

A trend line is then fitted to the lowest elevation angles at step 2106. The trend line may be fitted using an error minimisation algorithm, such as performing least squares regression or otherwise. At step 2108, the trend line is extrapolated to a desired focal distance and a trajectory is formed accordingly. As described with reference to process 2000, the desired focal distance may be constant or variable. An elevation angle of the trajectory is then found at step 2110. At step 2112, the scan profile with a compressed region at the found elevation angle is selected, which process may be similar to step 2010 of process 2000.

In yet another example process 2200 for selecting a scan profile as shown in FIG. 22, visual data is first captured at step 2202, for example, from a camera installed on the vehicle. The visual data may be in the form of image data, video data or in another suitable form.

At step 2204, horizon position and angle are estimated using visual cues obtained from the visual data. For example detection of the sky to land boundary may be performed based on colour differences. Various other image processing techniques may be utilised, based on colour differences or otherwise, to identify a horizon in an image or series of images.

At step 2206, the estimated horizon is projected on to a coordinate frame of the used spatial profiling arrangement. For example, where the relative fields of view of the camera and the spatial profiling arrangement are known, the projection may involve a determination of what regions of the camera field of view correspond to angles of elevation in the spatial profiling arrangement. An elevation angle of the estimated horizon is then determined at step 2208. At step 2210, a scan profile with a compressed region at the found elevation angle is selected, which process may be similar to step 2010 of process 2000.

Figure 23:
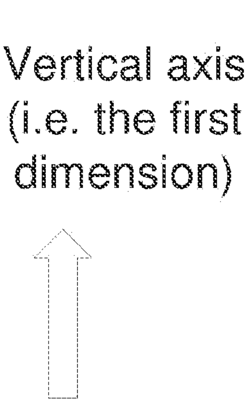
FIG. 23 illustrates an example showing how a scan profile can be dynamically selected from the predetermined set of scan profiles.
Figure 23:
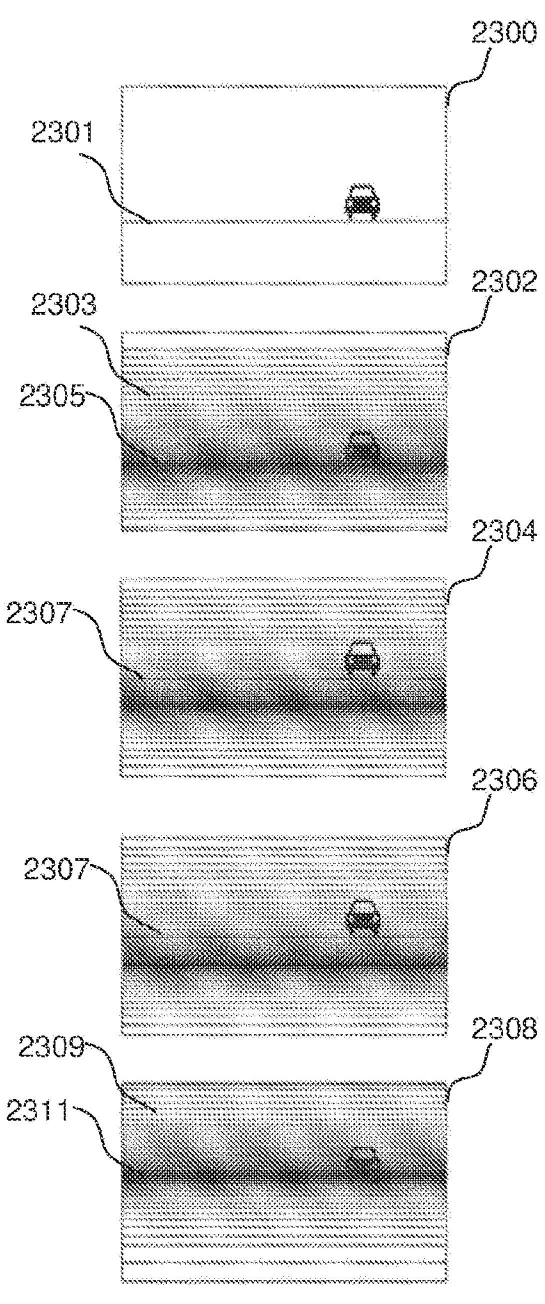
Figure 23:
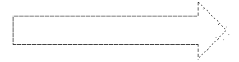

FIG. 23 illustrates an example showing dynamic selection of a scan profile from a predetermined set of scan profiles. Illustration 2300 shows a detected horizon 2301 at an elevation angle (e.g. −1.5 degrees). According to any one of the examples as discussed in FIGS. 20-22, a scan profile 2303 with a compressed region 2305 at the elevation angle of −1.5 degrees is selected as shown in illustration 2302.

The process involves detecting changes in the horizon. For example, processes 2002 to 2008, 2102 to 2110 or 2202 to 2208 of FIGS. 20-22 respectively may be repeated to determine if a horizon change has occurred. In an event where the horizon elevation angle changes (for example, the vehicle pitches and causes horizon angle to change as shown in illustration 2304), a new horizon 2307 is then detected at a different elevation angle (e.g. +1.5 degrees) as shown in illustrations 2304 and 2306.

Responsive to a determination, based on a newly detected horizon, that a threshold condition for selecting a new scan profile has been met, another scan profile 2309 with a compressed region 2311 at the elevation angle of 1.5 degrees is then selected, as shown in illustration 2308. The selection process may be the same or similar to the process described with reference to FIGS. 20-22. Once the scan profile along the first dimension is selected, the selected scan profile may be applied across the second dimension of the FOV as shown in FIG. 23. As a result, the scan profile is dynamically and automatically selected to include a compressed region that tracks the horizon.

The example of FIG. 23 accommodates vertical variations in the horizon, for example due to forwards and backward pitches of a moving vehicle. In some embodiments the dynamic and automatic selection process described above applies to only one dimension (in this example the vertical dimension). The vertical span of the compressed region may be selected to accommodate a range of variations in the other (horizontal) dimension. In other embodiments, the dynamic and automatic selection process may apply across both dimensions of the field of view (e.g. extend to the horizontal dimension in addition to the vertical dimension). Continuing with the example of a moving vehicle, horizontal adaptation allows for roll of the vehicle relative to the horizon.

Figure 24:
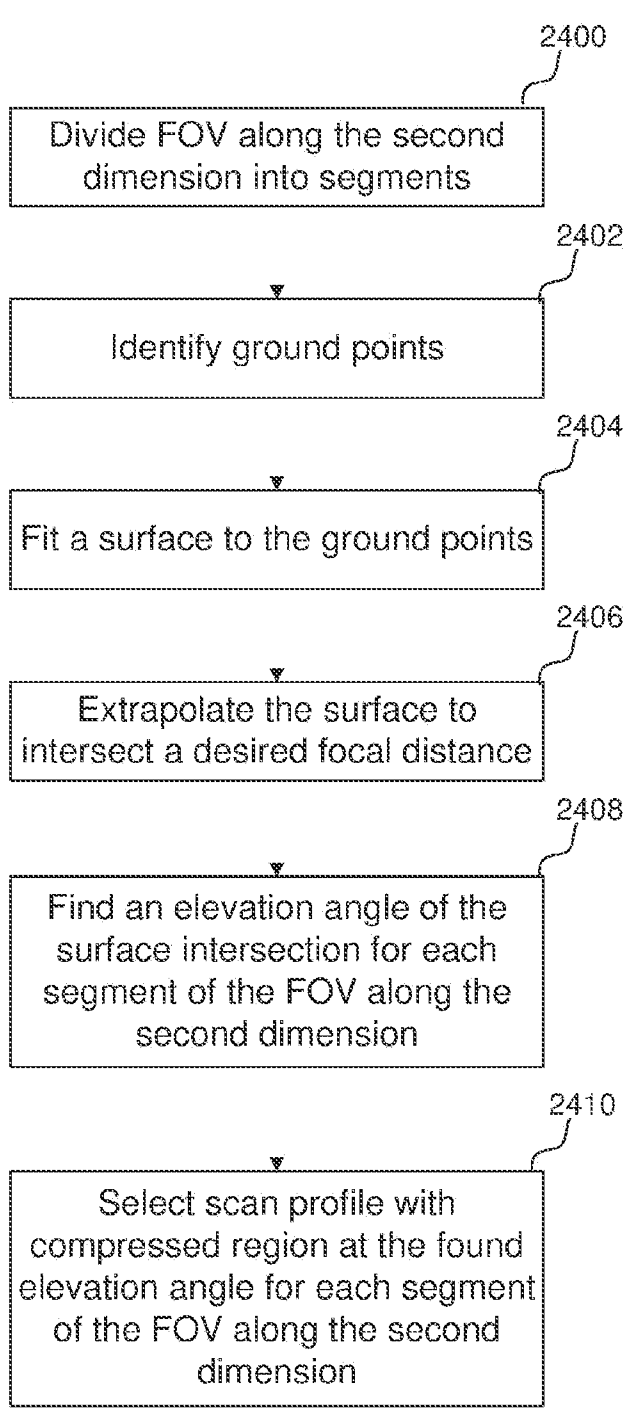
FIGS. 24 and 25 illustrate examples of process for creating a variable 2D scan profile.

FIG. 24 shows an example process for selecting a scan profile across two dimensions of a field of view. The process is again described with reference to the example of locating the vertical position of a horizon, but may be applied to other examples, including object tracking. For the purposes of illustration, the vertical dimension is called the "first dimension" and the horizontal dimension is called the "second dimension". At step 2400 the second dimension is divided into segments. For example, the second dimension may be segmented into twelve equally sized segments. It will be appreciated that other segment sizes and numbers may be selected, to increase the resolution of the system. For the purposes of this description each segment comprises at least two pixels across the dimension being segmented, but preferably comprises many pixels, so that the number of segments is about 500 or less or 50 or less or 25 or less. The segments may be equally sized, or of different sizes. For example, in the context of an autonomous vehicle, segments corresponding to those in front of the vehicle, or in front of and proximate the front of the vehicle, may be smaller than those at the periphery.

Following step 2400 the process includes steps 2402 to 2410. These steps correspond to steps 2002 to 2010 described with reference to FIG. 20 and therefore to avoid repetition only aspects that differ or may differ are described.

In some embodiments steps 2402 to 2406 are applied across the field of view, in which case the same process as that described with reference to FIG. 20 may be performed. In other embodiments, the fitting of a surface to the ground points in step 2404 and the extrapolation in step 2406 is conducted on a per segment basis. The fitting and extrapolation for a segment may be performed in the same way as described with reference to FIG. 20, using the grounds points identified for that segment.

Step 2408 is similar to step 2008, except that an elevation angle is determined for each segment of the second dimension. Similarly, in step 2410 a selection of a scan profile is made for each segment, based on the determined elevation angle for that segment.

Figure 25:
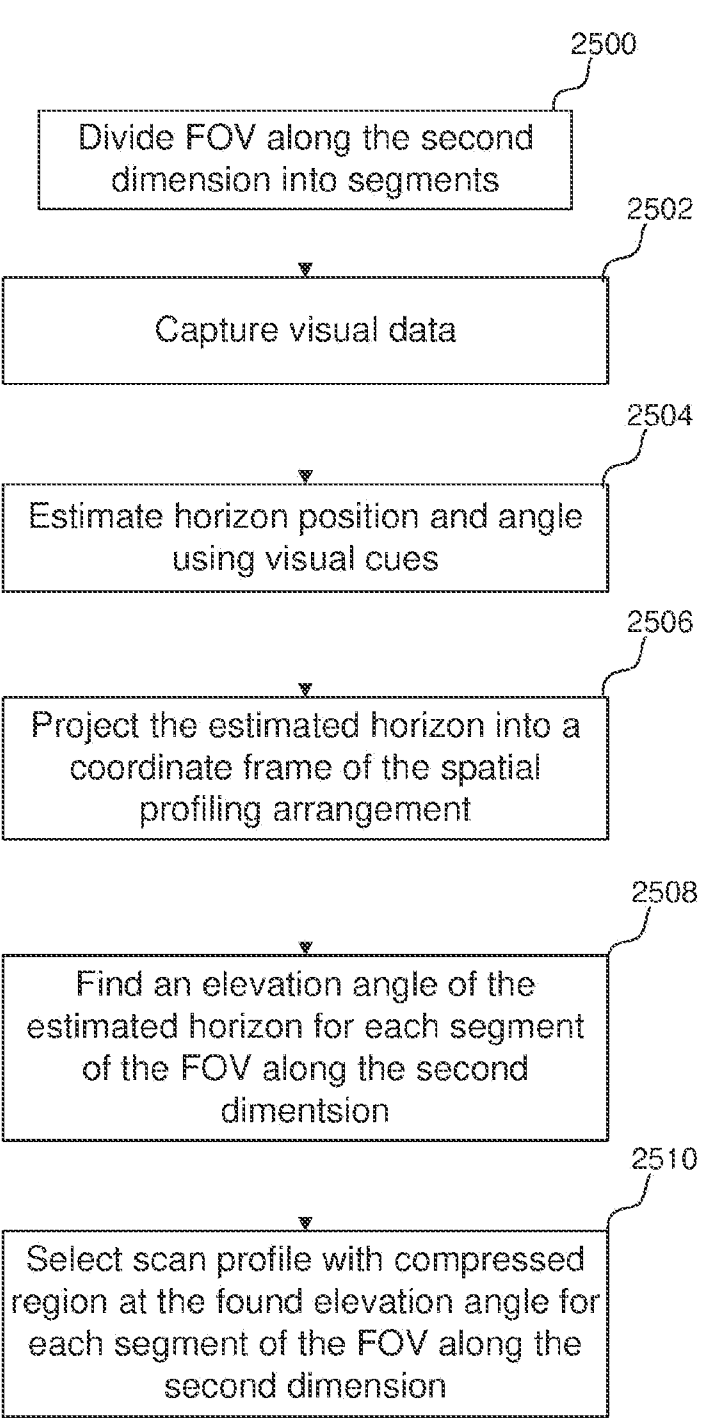

FIG. 25 shows an example process for selecting a scan profile across two dimensions of a field of view, again described with reference to the example of locating the vertical position of a horizon. Like the process of FIG. 24, in step 2500 a dimension ("the second dimension") is divided into segments. Steps 2502 to 2506 may be the same as steps 2002 to 2006 of FIG. 20 and therefore are not described again. In step 2508 an elevation angle is determined based on the estimated horizon for each segment and in step 2510 a scan profile is selected for each segment based on the elevation angle determined for that segment. These processes may be similar to those described for steps 2008 and 2010, except on a segment-by-segment basis.

Figure 26:
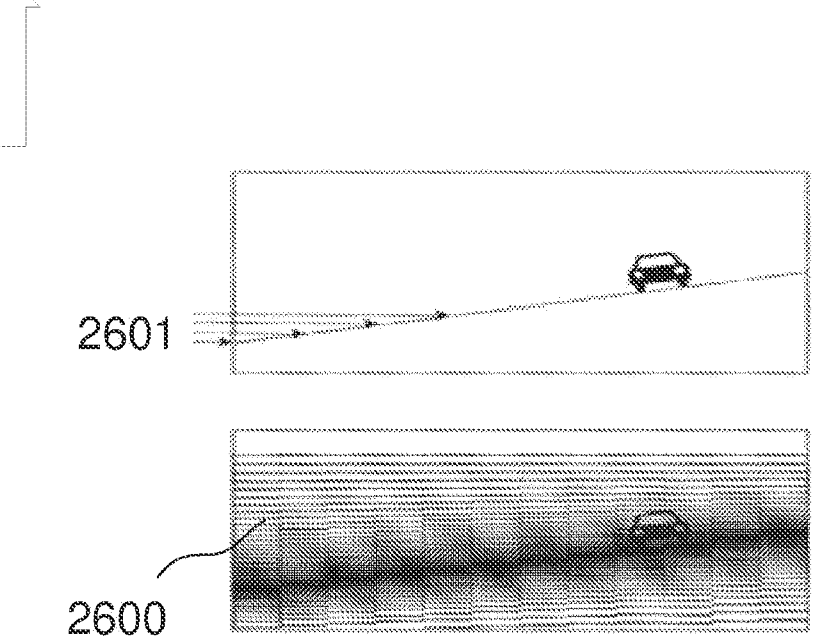
FIG. 26 illustrates an example variable 2D scan profile.

FIG. 26 illustrates an example variable 2D scan profile 2600 as result of applying the process as discussed in FIG. 24 or 25. Once the horizon is detected or determined at an elevation angle for each segment (collectively 2601) of the FOV along the second dimension (i.e. the horizontal dimension in this example), the scan profiles are selected for each segment of the FOV along the horizontal axis. It will be appreciated that the variable 2D scan profile may be particularly useful for cases where the road ahead sleesslopes left or right.

In other embodiments, pixel-by-pixel control of the scan patterns across at least one dimension of the field of view is performed. For example, in a spatial profiling system with wavelength-based steering, each pixel in the field of view may correspond with one or more pulses of light and the light source may be configured to control the wavelength on a pulse-by-pulse basis. From one perspective, this is a limit of progressively reducing the segment size across the aforementioned second dimension until the segment spans only one pixel. However, in many practical systems this level of control is unwarranted, requires too many resources and/or is not achievable within the constraints of the beam director. In systems with combined wavelength steering (providing a wavelength dimension) and mechanical steering (providing a mechanical dimension), the segments may be defined with reference to the mechanical dimension.

Figure 27:
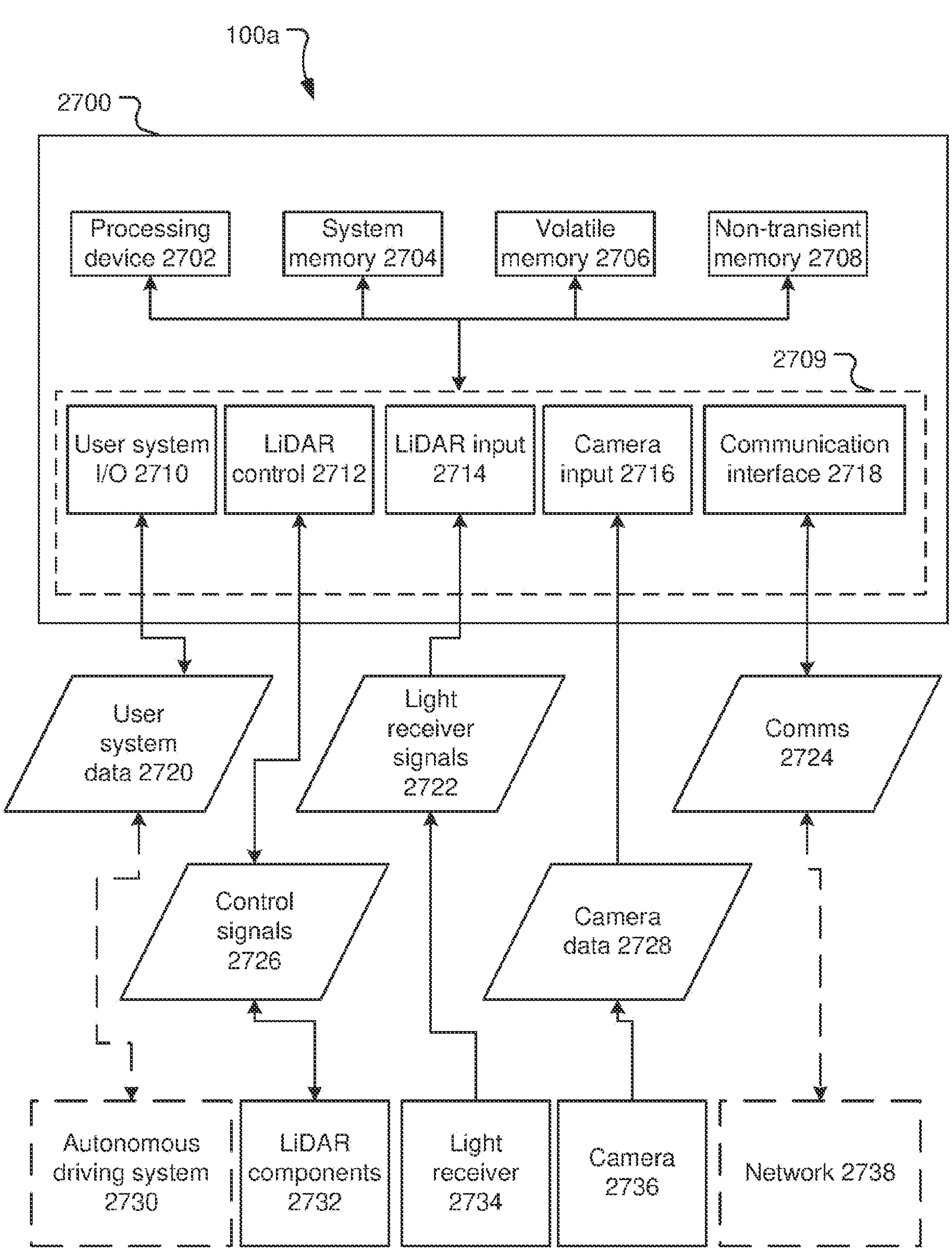
FIG. 27 shows a block diagram representation of a spatial profiling arrangement.

FIG. 27 shows a block diagram representation of a spatial profiling arrangement 100*a*. The spatial profiling arrangement 100*a* of FIG. 27 may be of the same or similar form as the spatial profiling arrangement 100 described with reference to FIG. 1, with additional details and components shown over those in in FIG. 1.

FIG. 27 includes a block diagram of a processing system 2700 configured to implement embodiments and/or features described herein, in particular the functions of the processing unit 105 of FIG. 1. System 2700 is a general purpose computer processing system. It will be appreciated that FIG. 27 does not illustrate all functional or physical components of a computer processing system. For example, no power supply or power supply interface has been depicted, however system 2700 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted. For example, processing system 2700 could be implemented in whole or in part by hardware and/or firmware or by a dedicated microcontroller instead of by a general purpose computer processing system.

Processing system 2700 includes at least one processing device 2702, for example a general or central processing unit, a graphics processing unit, or an alternative computational device. Processing system 2700 may include a plurality of computer processing devices. These devices need not be co-located. For succinctness and clarity the following description references a single processing device 2702.

Through a communications bus, processing device 2702 is in data communication with a one or more computer readable storage devices which store instructions and/or data for controlling operation of the processing system 2700. Example data is data defining one or more of the scan profiles for the spatial profiling arrangement. In this example processing system 2700 includes a system memory 2704 (e.g. a BIOS), volatile memory 2706 (e.g. random access memory such as one or more DRAM modules), and non-volatile (or non-transitory) memory 2708 (e.g. one or more hard disk or solid state drives). In general, instructions to cause the processing device 2702 to perform the functions described herein (in particular the functions of processing unit 105) are stored in the non-volatile memory 2708.

Processing system 2700 also includes one or more interfaces, indicated generally by 2709, via which processing system 2700 interfaces with various devices and/or networks. FIG. 27 represents each functional interface. These may be provided through separate physical interfaces or through a shared physical interface. Connection between the device or network and processing system 2700 may be via wired or wireless hardware and communication protocols, and may be a direct or an indirect (e.g. networked) connection.

Wired connection with other devices/networks may be by any appropriate standard or proprietary hardware and connectivity protocols, for example Universal Serial Bus (USB), eSATA, Thunderbolt, Ethernet, HDMI, and/or any other wired connection hardware/connectivity protocol. Wireless connection with other devices/networks may similarly be by any appropriate standard or proprietary hardware and communications protocols, for example optical protocols, WiFi; near field communications (NFC); Global System for Mobile Communications (GSM), Enhanced Data GSM Environment (EDGE), long term evolution (LTE), code division multiple access (CDMA—and/or variants thereof), and/or any other wireless hardware/connectivity protocol. It is anticipated that in most embodiments the connection for network communications will be wireless and the other connections of FIG. 27 will be wired.

A user system input/output 2710 is provided to at least send and in some embodiments send and receive user system data 2720. Outgoing user system data 2720 may include data generated based on light detected by the spatial estimation system. The data may be raw data, requiring processing to form a spatial estimation, or may be processed data, for example data in the form of a spatial estimation determined based on the raw data. In the example use case of an autonomous vehicle, the user system may be an autonomous driving system 2730 and the outgoing user system data 2720 is used for autonomous driving. Incoming user system data 2720 may include configuration information, such as information defining where the spatial estimation should foveate, what scan profile to use, what scan resolution to use, what communication information, if any, should be included in outgoing light and so forth. The processing device 2702 may be distinct from processing devices of the autonomous driving system 2730 or the processing device 2702 may form part of the autonomous driving system 2730 (i.e. one or more processing devices are configured to provide both spatial estimation and autonomous driving functions).

A LiDAR control 2712 is provided to at least sent and in some embodiments send and receive control signals 2726 for the LiDAR components 2732. Example outgoing control signals include signals to the light source 102, signals to the light receiver 104 and signals to the beam director 103 to control their respective operation. The control signals 2726 may implement wavelength-based steering and/or mechanical steering of the beam director 103, as described herein. Example incoming control signals may include feedback from one or more of these components, for example a measure of intensity of light received byte light receiver 104, to enable control over the power output of the light source 102.

A LiDAR input 2714 is provided to receive data from the light receiver 2734. This data is used for spatial estimation, as described herein. In embodiments which include a camera in addition to LiDAR, then camera data 2728 including images and/or video is received at a camera input 2716. In some embodiments the spatial estimation system 100*a* includes an ability to send and/or receive network communications 2724 with a network 2738 via a communication interface 2718, for example communications with a cellular or satellite network.

It will be understood that the disclosure disclosed and defined in this specification extends to all alternative combinations of two or more of the individual features mentioned or evident from the text or drawings. All of these different combinations constitute various alternative aspects of the disclosure.

What is claimed is:

1. A method of optical beam direction in a light detection and ranging system operable over a field of view, the method including:

providing to a beam director one or more first light beams to effect, by the light detection and ranging system, a first angular resolution and a first temporal resolution within the field of view;

receiving light returned from an environment and generating, by the light detection and ranging system, at least one signal indicative of a characteristic of the environment;

receiving a selection of a scan profile from a plurality of selectable scan profiles associated with one or more second light beams to effect a second angular resolution and second temporal resolution within the field of view and providing the selected one or more second light beams to the beam director;

wherein the selection is based on the at least one signal and wherein over at least a portion of the field of view the second angular resolution differs from the first angular resolution and wherein the one or more second light beams effect the second angular resolution within a first portion of the field of view and also effect a third angular resolution within a second portion of the field of view different to the first portion, wherein the third angular resolution is different to the second angular resolution, wherein the angular resolutions are with respect to a first dimension in the field of view and the selected scan profile is a first scan profile, and wherein the method further comprises:

performing a scan iteration across the first dimension and a second dimension orthogonal to the first dimension, wherein within the scan iteration a first horizontal section of the field of view uses the first scan profile and a second horizontal section of the field of view uses a second scan profile;

determining, based on the at least one signal indicative of a characteristic of the environment, a horizon extending at a non-zero elevation angle across the second dimension; and selecting each of the first scan profile and the second scan profile from the plurality of selectable scan profiles based on the determined horizon.

2. The method of claim 1, wherein:

a wavelength controlled light source, based on wavelength, effects the step of providing one or more first light beams at the first angular resolution and the first temporal resolution within the field of view.

3. The method of claim 2, wherein the one or more first light beams comprises a first set of wavelength channels and the one or more second light beams comprises a second set of wavelength channels, different to the first set of wavelengths channels and wherein the method further comprises providing to the beam director one or more third light beams after the one or more second light beams, wherein the one or more third light beams comprises the first set of wavelength channels.

4. The method of claim 2, wherein the first and second light beams comprise optical pulses and wherein there are more optical pulses within a first wavelength range in the first light beam than there are optical pulses within the first wavelength range in the second light beam.

5. The method of claim 4, wherein there are less optical pulses within a second wavelength range, different to the first wavelength range, in the first light beam than there are optical pulses within the second wavelength range in the second light beam.

6. The method of claim 1, wherein the first and second light beams comprise the same number of optical pulses.

7. The method of claim 1, wherein the one or more first light beams effect a first field of view of the light detection and ranging system and the one or more second light beams effect a second field of view of the light detection and ranging system, different to the first field of view.

8. The method of claim 1, wherein the one or more first light beams effect the first angular resolution within a third portion of the field of view and also effect a fourth angular resolution within a fourth portion of the field of view, wherein the fourth angular resolution is different to the first angular resolution and the fourth portion of the field of view is different to the third portion of the field of view.

9. The method of claim 8, wherein the third angular resolution is the same as the fourth angular resolution.

10. The method of claim 8, wherein the third angular resolution is different to the fourth angular resolution.

11. The method of claim 8, wherein the first portion of the field of view covers same angular extent as the second portion of the field of view and the second portion of the field of view covers the same angular extent as the fourth portion of the field of view.

12. The method of claim 1, wherein the one or more first light beams effect the first angular resolution across the entire field of view.

13. The method of claim 12, wherein the one or more first light beams effect a substantially constant angular resolution across the entire field of view.

14. The method of claim 1, wherein the second temporal resolution is the same as the first temporal resolution.

15. The method of claim 1, wherein the second temporal resolution differs from the first temporal resolution.

16. The method of claim 1, wherein the second angular resolution is higher than the third angular resolution and the process of selecting comprises determining the scan profile as having the first portion at a location of the determined horizon.

17. The method of claim 1, wherein the plurality of selectable scan profiles comprises areas of higher angular resolution at different locations, corresponding to different determinable horizons in the field of view.

18. The method of claim 1, wherein:

the method further comprises determining, based on the at least one signal indicative of a characteristic of the environment, a predicted travel path in the field of view; and selecting the scan profile from the plurality of selectable scan profiles based on the determined predicted travel path.

* * * * *